US012719652B2

(12) United States Patent
Yang et al.

(10) Patent No.: US 12,719,652 B2
(45) Date of Patent: Aug. 25, 2026

(54) METHOD FOR DETERMINING BEAM APPLICATION TIME, APPARATUS FOR DETERMINING BEAM APPLICATION TIME, AND COMMUNICATION DEVICE

(71) Applicant: VIVO MOBILE COMMUNICATION CO., LTD., Guangdong (CN)

(72) Inventors: Yu Yang, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 244 days.

(21) Appl. No.: 18/513,243

(22) Filed: Nov. 17, 2023

(65) Prior Publication Data

US 2024/0089070 A1 Mar. 14, 2024

Related U.S. Application Data

(63) Continuation of application No. PCT/CN2022/093551, filed on May 18, 2022.

(30) Foreign Application Priority Data

May 18, 2021 (CN) ......................... 202110542174.0

(51) Int. Cl.
*H04L 5/00* (2006.01)
*H04W 72/232* (2023.01)

(52) U.S. Cl.
CPC .......... *H04L 5/0094* (2013.01); *H04L 5/0055* (2013.01); *H04W 72/232* (2023.01)

(58) Field of Classification Search
CPC .. H04L 5/0094; H04L 5/0055; H04W 72/232; H04W 72/046; H04W 72/23; H04B 7/0695
See application file for complete search history.

(56) References Cited

U.S. PATENT DOCUMENTS

2019/0132029 A1 5/2019 Sun et al.
2019/0281660 A1 9/2019 Cui et al.
(Continued)

FOREIGN PATENT DOCUMENTS

CN 108925142 A 11/2018
WO 2020159189 A1 8/2020

OTHER PUBLICATIONS

International Search Report and Written Opinion for Application No. PCT /CN2022/093551, dated Aug. 5, 2022, 8 Pages.
(Continued)

*Primary Examiner* — Christine Ng
(74) *Attorney, Agent, or Firm* — BROOKS KUSHMAN P.C.

(57) ABSTRACT

A method for determining beam application time includes: receiving, by a terminal, beam indication signaling, where the beam indication signaling is used to indicate common beam information; determining, by the terminal, a target subcarrier spacing according to a subcarrier spacing determining rule, where the target subcarrier spacing includes a first target subcarrier spacing corresponding to N component carriers CCs or a second target subcarrier spacing corresponding to a first bandwidth part BWP of the N CCs, the first BWP is a BWP to which the common beam information is applied; and determining, by the terminal, a beam application time based on the target subcarrier spacing, where the beam application time includes a first beam application time corresponding to the N CCs or a second beam application time corresponding to the first BWP of the N CCs.

18 Claims, 6 Drawing Sheets

(56) References Cited

U.S. PATENT DOCUMENTS

2020/0413415 A1 12/2020 Tang
2021/0092760 A1* 3/2021 Nam ..................... H04L 5/0092
2021/0243075 A1* 8/2021 Ryu ...................... H04L 5/0048
2022/0110059 A1* 4/2022 Xue .................. H04W 52/0235
2022/0131583 A1 4/2022 Lee et al.
2022/0217751 A1* 7/2022 Zhou ..................... H04L 5/0048
2022/0231801 A1* 7/2022 Tsai .................. H04W 72/0446
2022/0239419 A1* 7/2022 Bai ....................... H04L 5/0082
2022/0272685 A1* 8/2022 Rahman .............. H04W 72/046
2022/0360405 A1* 11/2022 Jiang ..................... H04L 5/0094
2023/0403064 A1* 12/2023 Yao ......................... H04L 5/001
2024/0187178 A1* 6/2024 Matsumura ........... H04L 5/0051

OTHER PUBLICATIONS

MediaTek Inc. "Enhancement on multi-beam operation" 3GPP TSG RAN WG1 #104-e, e-Meeting, Jan. 2021, R1-2100588, 27 Pages.
Vivo "Further discussion on multi beam enhancement" 3GPP TSG RAN WG1 #104b-e, e-Meeting, Apr. 2021, R1-2102506, 29 Pages.
European Search Report for Application No. 22803997.0, mailed Oct. 11, 2024, 8 pages.
First Korean Office Action for Korean Patent Application No. 1020237043323 mailed Dec. 10, 2025. 11 pages.
Nokia, Nokia Shanghai Bell. Enhancements on Multi beam Operation. 3GPP TSG RAN WG1 #104-e. R1-2101005. Online. Jan.-Feb. 2021. 24 pages.

* cited by examiner

METHOD FOR DETERMINING BEAM APPLICATION TIME, APPARATUS FOR DETERMINING BEAM APPLICATION TIME, AND COMMUNICATION DEVICE

CROSS-REFERENCE TO RELATED APPLICATIONS

This application is a continuation of International Application No. PCT/CN2022/093551 filed on May 18, 2022, which claims priority to Chinese Patent Application No. 202110542174.0 filed on May 18, 2021, which are incorporated herein by reference in their entireties.

TECHNICAL FIELD

This application relates to the field of communications technologies, and in particular, to a method for determining beam application time, an apparatus for determining beam application time, and a communication device.

BACKGROUND

In a case that downlink control information (DCI) indicates a common beam and if the common beam is used for determining beam information for a group of component carriers (CC), a challenge arises in determining a beam application time (BAT) for each CC in the group of CCs because the DCI is located on a CC and a subcarrier spacing (SCS) of each CC in the group of CCs may be different. However, there is no related solution to address this challenge.

SUMMARY

According to a first aspect, a method for determining beam application time is provided, including:

receiving, by a terminal, beam indication signaling, where the beam indication signaling is used to indicate common beam information;

determining, by the terminal, a target subcarrier spacing according to a subcarrier spacing determining rule, where the target subcarrier spacing includes a first target subcarrier spacing corresponding to N component carriers CCs or a second target subcarrier spacing corresponding to a first bandwidth part BWP of the N CCs, N is greater than or equal to 1, the first BWP is a BWP to which the common beam information is applied, and the first BWP includes at least one of an uplink BWP and a downlink BWP; and determining, by the terminal, a beam application time based on the target subcarrier spacing, where the beam application time includes a first beam application time corresponding to the N CCs or a second beam application time corresponding to the first BWP of the N CCs.

According to a second aspect, a method for determining beam application time is provided, including:

sending, by a network-side device, beam indication signaling, where the beam indication signaling is used to indicate common beam information;

determining, by the network-side device, a target subcarrier spacing according to a subcarrier spacing determining rule, where the target subcarrier spacing includes a first target subcarrier spacing corresponding to N component carriers CCs or a second target subcarrier spacing corresponding to a first bandwidth part BWP of the N CCs, N is greater than or equal to 1, the first BWP is a BWP to which the common beam information is applied, and the first BWP includes at least one of an uplink BWP and a downlink BWP; and determining, by the network-side device, a beam application time based on the target subcarrier spacing, where the beam application time includes a first beam application time corresponding to the N CCs or a second beam application time corresponding to the first BWP of the N CCs.

According to a third aspect, an apparatus for determining beam application time is provided, including:

a first transceiver module, configured to receive beam indication signaling, where the beam indication signaling is used to indicate common beam information;

a first determining module configured to determine a target subcarrier spacing according to a subcarrier spacing determining rule, where the target subcarrier spacing includes a first target subcarrier spacing corresponding to N component carriers CCs or a second target subcarrier spacing corresponding to a first bandwidth part BWP of the N CCs, N is greater than or equal to 1, the first BWP is a BWP to which the common beam information is applied, and the first BWP includes at least one of an uplink BWP and a downlink BWP; and a second determining module configured to determine a beam application time based on the target subcarrier spacing, where the beam application time includes a first beam application time corresponding to the N CCs or a second beam application time corresponding to the first BWP of the N CCs.

According to a fourth aspect, an apparatus for determining beam application time is provided, including:

a second transceiver module, configured to send beam indication signaling, where the beam indication signaling is used to indicate common beam information;

a third determining module configured to determine a target subcarrier spacing according to a subcarrier spacing determining rule, where the target subcarrier spacing includes a first target subcarrier spacing corresponding to N component carriers CCs or a second target subcarrier spacing corresponding to a first bandwidth part BWP of the N CCs, N is greater than or equal to 1, the first BWP is a BWP to which the common beam information is applied, and the first BWP includes at least one of an uplink BWP and a downlink BWP; and a fourth determining module configured to determine a beam application time based on the target subcarrier spacing, where the beam application time includes a first beam application time corresponding to the N CCs or a second beam application time corresponding to the first BWP of the N CCs.

According to a fifth aspect, a terminal is provided, where the terminal includes a processor, a memory, and a program or instructions stored in the memory and capable of running on the processor, and when the program or instructions are executed by the processor, the steps of the method according to the first aspect are implemented.

According to a sixth aspect, a terminal is provided, including a processor and a communication interface, where the communication interface is configured to receive beam indication signaling, where the beam indication signaling is used to indicate common beam information; and the processor is configured to determine a target subcarrier spacing according to a subcarrier spacing determining rule, where the target subcarrier spacing includes a first target subcarrier spacing corresponding to N component carriers CCs or a second target subcarrier spacing corresponding to a first bandwidth part BWP of the N CCs, N is greater than or equal to 1, the first BWP is a BWP to which the common beam information is applied, and the first BWP includes at least one of an uplink BWP and a downlink BWP; and determine a beam application time based on the target subcarrier spacing, where the beam application time includes a first beam application time corresponding to the N CCs or a second beam application time corresponding to the first BWP of the N CCs.

According to a seventh aspect, a network-side device is provided, where the network-side device includes a processor, a memory, and a program or instructions stored in the memory and capable of running on the processor, and when the program or instructions are executed by the processor, the steps of the method according to the second aspect are implemented.

According to an eighth aspect, a network-side device is provided, including a processor and a communication interface. The communication interface is configured to send beam indication signaling, where the beam indication signaling is used to indicate common beam information; and the processor is configured to determine a target subcarrier spacing according to a subcarrier spacing determining rule, where the target subcarrier spacing includes a first target subcarrier spacing corresponding to N component carriers CCs or a second target subcarrier spacing corresponding to a first bandwidth part BWP of the N CCs, N is greater than or equal to 1, the first BWP is a BWP to which the common beam information is applied, and the first BWP includes at least one of an uplink BWP and a downlink BWP; and determine a beam application time based on the target subcarrier spacing, where the beam application time includes a first beam application time corresponding to the N CCs or a second beam application time corresponding to the first BWP of the N CCs.

According to a ninth aspect, a readable storage medium is provided, where a program or instructions are stored in the readable storage medium, and when the program or instructions are executed by a processor, the steps of the method according to the first aspect are implemented, or the steps of the method according to the second aspect are implemented.

According to a tenth aspect, a chip is provided, where the chip includes a processor and a communication interface, the communication interface is coupled to the processor, and the processor is configured to run a program or instructions to implement the method according to the first aspect or implement the method according to the second aspect.

According to an eleventh aspect, a computer program/program product is provided, where the computer program/program product is stored in a storage medium, and the program/program product is executed by at least one processor to implement the steps of the method according to the first aspect or the second aspect.

According to a twelfth aspect, a communication device is provided, configured to execute the steps of the method according to the first aspect or execute the steps of the method according to the second aspect.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, there may be one or more first objects. In addition, "and/or" in this specification and claims indicates at least one of connected objects, and the symbol "I" generally indicates that the associated objects are in an "or" relationship.

It should be noted that techniques described in the embodiments of this application are not limited to a long term evolution (LTE) or LTE-advanced (LTE-A) system, and may also be applied to various wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communications system.

Figure 1:
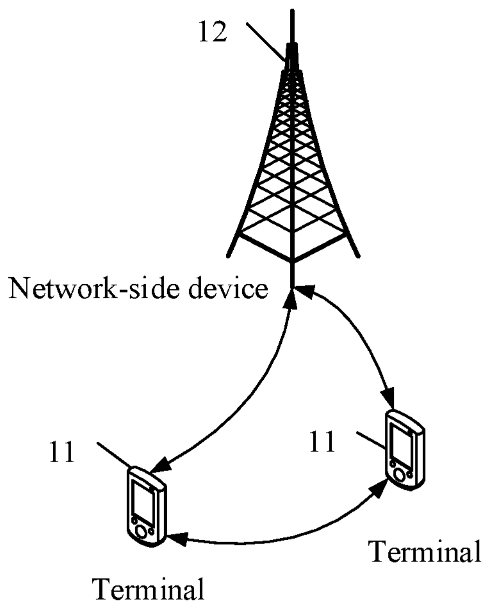
FIG. 1 is a structural diagram of a communications system to which the embodiments of this application are applicable.

FIG. 1 is a block diagram of a wireless communications system to which the embodiments of this application are applicable. The wireless communication system includes a terminal 11 and a network-side device 12. The terminal 11 may also be referred to as a terminal device or user equipment (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a smart watch, a wrist band, earphones, glasses, or the like. It should be noted that a specific type of the terminal 11 is not limited in the embodiments of this application. The network-side device 12 may be a base station or a core network device. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a wireless fidelity (WiFi) node, a transmission and reception point (Transmission Reception Point, TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail a method for determining beam application time provided in the embodiments of this application by using some embodiments and application scenarios thereof with reference to the accompanying drawings.

Figure 2:
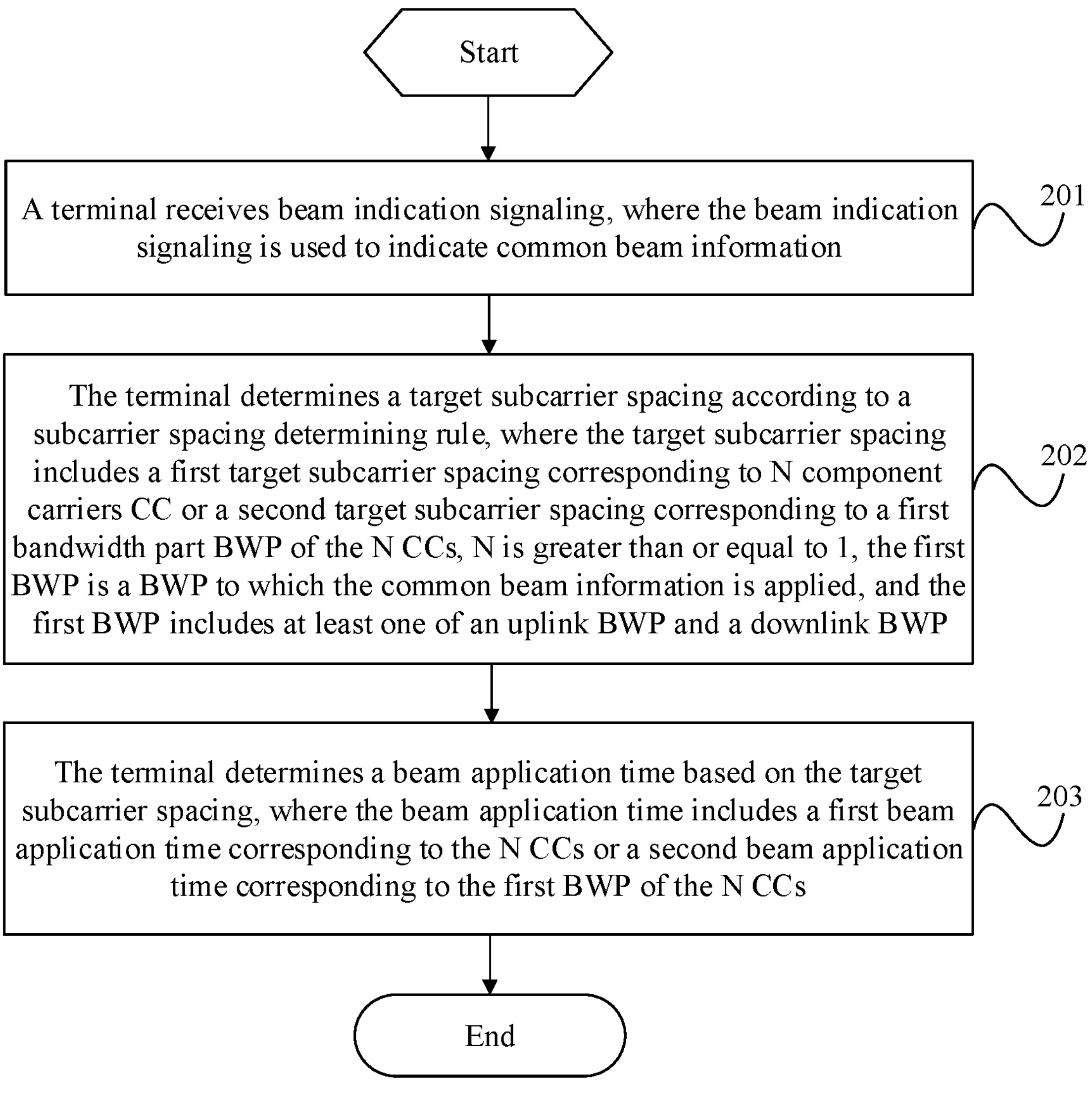
FIG. 2 is a first schematic flowchart of a method for determining beam application time according to an embodiment of this application.

As shown in FIG. 2, an embodiment of this application provides a method for determining beam application time including the following steps.

Step 201: A terminal receives beam indication signaling, where the beam indication signaling is used to indicate common beam information.

In this step, the beam indication signaling is used to indicate common beam information of N component carriers (Component Carrier, CC). The common beam information is used for determining beam information of all or part of channels or reference signals of the CCs, for example, being used for determining beam information for terminal-dedicated reception on PDSCH (UE-dedicated reception on PDSCH), terminal-specific control resource set (UE-specific CORESET), non-terminal-specific control resource set (non-UE-specific CORESET), and PUCCH or PUSCH, where N is greater than or equal to 1.

The common beam information may be a joint TCI state or a separate TCI state. In the joint TCI state, uplink and downlink share a same TCI state, that is, sharing same beam information, and in the separate TCI state, uplink and downlink use their respective TCI states, that is, using their respective beam information.

It should be noted that the beam information in the embodiments of this application may also be referred to as: identification information of beam, spatial relation information, spatial domain transmission filter information, spatial domain reception filter information, spatial filter information, transmission configuration indicator state (TCI state) information, quasi co-location (QCL) information, or QCL parameter. Downlink beam information may usually be represented by using TCI state information or QCL information. Uplink beam information may be usually represented by using TCI state information or spatial relation information.

Step 202: The terminal determines a target subcarrier spacing according to a subcarrier spacing determining rule, where the target subcarrier spacing includes a first target subcarrier spacing corresponding to N component carriers CCs or a second target subcarrier spacing corresponding to a first bandwidth part (BWP) of the N CCs, N is greater than or equal to 1, the first BWP is a BWP to which the common beam information is applied, and the first BWP includes at least one of an uplink BWP or a downlink BWP.

Step 203: The terminal determines a beam application time based on the target subcarrier spacing, where the beam application time includes a first beam application time corresponding to the N CCs or a second beam application time corresponding to the first BWP of the N CCs.

Specifically, the first beam application time is determined based on the first target subcarrier spacing, or the second beam application time is determined based on the second target subcarrier spacing.

In the method for determining beam application time in this embodiment of this application, after receiving the beam indication signaling, the terminal determines, according to the subcarrier spacing determining rule, the first target subcarrier spacing corresponding to the N component carriers CCs or the second target subcarrier spacing corresponding to the first bandwidth part BWP of the N CCs, and determines the first beam application time based on the first target subcarrier spacing or determines the second beam application time based on the second target subcarrier spacing, so as to determine the beam application time corresponding to the plurality of CCs or the BWPs of the plurality of CCs. This ensures consistent understanding on the beam application time between the network and the UE, which in turn can ensure beam alignment and correct data transmission.

Optionally, the receiving, by a terminal, beam indication signaling includes:

receiving, by the terminal, downlink control information DCI or a media access control control element MAC CE, where the DCI or the MAC CE carries the beam indication signaling.

For example, the beam indication signaling is sent by using a DCI format for scheduling downlink transmission (DCI format with DL assignment) or a DCI format without scheduling downlink transmission (DCI format without DL assignment), such as DCI format 1_1 or 1_2.

Optionally, the DCI or the MAC CE is not used for scheduling data transmission.

Optionally, N>1, and N CCs belong to a first CC group.

The DCI or the MAC CE indicates identification information of the first CC group; or the DCI or the MAC CE indicates identification information of a first CC, the first CC being included in the first CC group.

In this implementation, the network configures a CC list or a CC group, where the CC list or the CC group includes a group of CCs, and the group of CCs may be CCs for intra-band carrier aggregation or CCs for inter-band carrier aggregation.

In a first optional implementation, the subcarrier spacing determining rule includes at least one of the following:

determining a subcarrier spacing of a second CC as a first target subcarrier spacing corresponding to the second CC, where the second CC is any one of the N CCs; that is, a first target subcarrier spacing corresponding to each CC is determined according to a subcarrier spacing of each CC, for example, if a subcarrier spacing of CC1 is SCS1 and a subcarrier spacing of CC2 is SCS2, SCS1 is used as a first target subcarrier spacing corresponding to CC1, and SCS2 is used as a first target subcarrier spacing corresponding to CC2;

determining, based on a subcarrier spacing of a CC in which a first physical downlink control channel PDCCH is located, the first target subcarrier spacing corresponding to the second CC, where the first PDCCH is a PDCCH carrying the DCI;

determining, based on a subcarrier spacing of a CC in which an acknowledgement ACK message of the DCI is located, the first target subcarrier spacing corresponding to the second CC;

determining, based on a first preset subcarrier spacing, the first target subcarrier spacing corresponding to the second CC, where the first preset subcarrier spacing is obtained by processing, according to a preset processing rule, the subcarrier spacing of the second CC and the subcarrier spacing of the CC in which the first PDCCH is located; where for example, a largest or smallest subcarrier spacing in the subcarrier spacing of the second CC and the subcarrier spacing of the CC in which the first PDCCH is located is selected as the first target subcarrier spacing; for example, if the subcarrier spacing of CC1 is SCS1, the subcarrier spacing of CC2 is SCS2, and the subcarrier spacing of the CC in which the first PDCCH is located is SCSpdcch, a smallest SCS of SCS1 and SCSpdcch is used as the first target subcarrier spacing corresponding to CC1, and a smallest SCS of SCS2 and SCSpdcch is used as the first target subcarrier spacing corresponding to CC2;

determining, based on a second preset subcarrier spacing, the first target subcarrier spacing corresponding to the second CC, where the second preset subcarrier spacing is obtained by processing, according to the preset processing rule, the subcarrier spacing of the second CC and the subcarrier spacing of the CC in which the acknowledgement ACK message of the DCI is located; where for example, a largest or smallest subcarrier spacing in the subcarrier spacing of the second CC and the subcarrier spacing of the CC in which the acknowledgement ACK message of the DCI is located is selected as the first target subcarrier spacing; for example, if the subcarrier spacing of CC1 is SCS1, the subcarrier spacing of CC2 is SCS2, and the subcarrier spacing of the CC in which the acknowledgement ACK message of the DCI is located is SCSack, a smallest SCS of SCS1 and SCSack is used as the first target subcarrier spacing corresponding to CC1, and a smallest SCS of SCS2 and SCSack is used as the first target subcarrier spacing corresponding to CC2;

determining, based on a third preset subcarrier spacing, the first target subcarrier spacing corresponding to the second CC, where the third preset subcarrier spacing is obtained by processing, according to the preset processing rule, the subcarrier spacing of the second CC, the subcarrier spacing of the CC in which the first PDCCH is located, and the subcarrier spacing of the CC in which the acknowledgement ACK message of the DCI is located; where for example, a largest or smallest subcarrier spacing in the subcarrier spacing of the second CC, the subcarrier spacing of the CC in which the first PDCCH is located, and the subcarrier spacing of the CC in which the acknowledgement ACK message of the DCI is located is selected as the first target subcarrier spacing; for example, if the subcarrier spacing of CC1 is SCS1, the subcarrier spacing of CC2 is SCS2, the subcarrier spacing of the CC in which the first PDCCH is located is SCSpdcch, and the subcarrier spacing of the CC in which the acknowledgement ACK message of the DCI is located is SCSack, a smallest SCS of SCS1, SCSpdcch, and SCSack is used as the first target subcarrier spacing corresponding to CC1, and a smallest SCS of SCS2, SCSpdcch, and SCSack is used as the first target subcarrier spacing corresponding to CC2;

determining, based on a fourth preset subcarrier spacing, a first target subcarrier spacing corresponding to each of the N CCs, where the fourth preset subcarrier spacing is obtained by processing subcarrier spacings of all CCs in the N CCs according to the preset processing rule; where for example, a largest or smallest subcarrier spacing is selected from the subcarrier spacings of all the CCs in the N CCs as a same first target subcarrier spacing of each of the N CCs; for example, N=2 and the subcarrier spacing of CC1 is SCS1 and the subcarrier spacing of CC2 is SCS2, a smallest SCS of SCS1 and SCS2 is used as the first target subcarrier spacing corresponding to CC1 and also as the first target subcarrier spacing corresponding to CC2; in other words, the first target subcarrier spacings of CC1 and CC2 are the same;

determining, based on a fifth preset subcarrier spacing, the first target subcarrier spacing corresponding to each of the N CCs, where the fifth preset subcarrier spacing is obtained by processing, according to the preset processing rule, the subcarrier spacings of all the CCs in the N CCs and the subcarrier spacing of the CC in which the first PDCCH is located; where for example, a largest or smallest subcarrier spacing in the subcarrier spacings of all the CCs in the N CCs and the subcarrier spacing of the CC in which the first PDCCH is located is selected as a same first target subcarrier spacing of each of the N CCs; for example, if N=2, the subcarrier spacing of CC1 is SCS1, the subcarrier spacing of CC2 is SCS2, and the subcarrier spacing of the CC in which the first PDCCH is located is SCSpdcch, a smallest SCS of SCS1, SCS2, and SCSpdcch is used as the first target subcarrier spacing corresponding to CC1 and also as the first target subcarrier spacing corresponding to CC2; in other words, the first target subcarrier spacings of CC1 and CC2 are the same;

determining, based on a sixth preset subcarrier spacing, the first target subcarrier spacing corresponding to each of the N CCs, where the sixth preset subcarrier spacing is obtained by processing, according to the preset processing rule, the subcarrier spacings of all the CCs in the N CCs and the subcarrier spacing of the CC in which the acknowledgement ACK message of the DCI is located; where for example, a largest or smallest subcarrier spacing in the subcarrier spacings of all the CCs in the N CCs and the subcarrier spacing of the CC in which the acknowledgement ACK message of the DCI is located is selected as a same first target subcarrier spacing of each of the N CCs; for example, if N=2, the subcarrier spacing of CC1 is SCS1, the subcarrier spacing of CC2 is SCS2, and the subcarrier spacing of the CC in which the acknowledgement ACK message of the DCI is located is SCSack, a smallest SCS of SCS1, SCS2, and SCSack is used as the first target subcarrier spacing corresponding to CC1 and also as the first target subcarrier spacing corresponding to CC2; in other words, the first target subcarrier spacings of CC1 and CC2 are the same; or determining, based on a seventh preset subcarrier spacing, the first target subcarrier spacing corresponding to each of the N CCs, where the seventh preset subcarrier spacing is obtained by processing, according to the preset processing rule, the subcarrier spacings of all the CCs in the N CCs, the subcarrier spacing of the CC in which the first PDCCH is located, and the subcarrier spacing of the CC in which the acknowledgement ACK message of the DCI is located; where, for example, a largest or smallest subcarrier spacing in the subcarrier spacings of all the CCs in the N CCs, the subcarrier spacing of the CC in which the first PDCCH is located, and the subcarrier spacing of the CC in which the acknowledgement ACK message of the DCI is located is selected as a same first target subcarrier spacing of each of the N CCs; for example, if N=2, the subcarrier spacing of CC1 is SCS1, the subcarrier spacing of CC2 is SCS2, the subcarrier spacing of the CC in which the first PDCCH is located is SCSpdcch, and the subcarrier spacing of the CC in which the acknowledgement ACK message of the DCI is located is SCSack, a smallest SCS of SCS1, SCS2, SCSpdcch, and SCSack is used as the first target subcarrier spacing corresponding to CC1 and also as the first target subcarrier spacing corresponding to CC2; in other words, the first target subcarrier spacings of CC1 and CC2 are the same.

In a second optional implementation, the subcarrier spacing determining rule includes at least one of the following:

determining a subcarrier spacing of a first BWP on a second CC as a second target subcarrier spacing corresponding to the first BWP on the second CC; that is, determining a second target subcarrier spacing corresponding to each first BWP based on subcarrier spacings of first BWPs to which the common beam information is applied; where for example, if the first BWPs include BWP1 and BWP2, the subcarrier spacing of BWP1 is SCS1, and the subcarrier spacing of BWP2 is SCS2, SCS1 is used as a second target subcarrier spacing corresponding to BWP1, and SCS2 is used as a second target subcarrier spacing corresponding to BWP2;

determining, based on a subcarrier spacing of a second BWP, the second target subcarrier spacing corresponding to the first BWP on the second CC, where the second BWP is a BWP in which a first PDCCH is located, and the first PDCCH is a PDCCH carrying the DCI;

determining, based on a subcarrier spacing of a third BWP, the second target subcarrier spacing corresponding to the first BWP on the second CC, where the third BWP is a BWP in which an acknowledgement ACK message of the DCI is located;

determining, based on an eighth preset subcarrier spacing, the second target subcarrier spacing corresponding to the first BWP on the second CC, where the eighth preset subcarrier spacing is obtained by processing, according to the preset processing rule, the subcarrier spacing of the first BWP and the subcarrier spacing of the second BWP; where, for example, a largest or smallest subcarrier spacing in the subcarrier spacings of the first BWPs to which the common beam information is applied and the subcarrier spacing of the second BWP is selected as the second target subcarrier spacing corresponding to the first BWP; for example, if the first BWP includes BWP1 and BWP2, the subcarrier spacing of BWP1 is SCS1, the subcarrier spacing of BWP2 is SCS2, and the subcarrier spacing of the second BWP is SCSpdcch, a smallest SCS of SCS1 and SCSpdcch is used as the second target subcarrier spacing corresponding to BWP1, and a smallest SCS of SCS2 and SCSpdcch is used as the second target subcarrier spacing corresponding to BWP2;

determining, based on a ninth preset subcarrier spacing, the second target subcarrier spacing corresponding to the first BWP on the second CC, where the ninth preset subcarrier spacing is obtained by processing, according to the preset processing rule, the subcarrier spacing of the first BWP and the subcarrier spacing of the third BWP; where, for example, a largest or smallest subcarrier spacing in the subcarrier spacings of the first BWPs to which the common beam information is applied and the subcarrier spacing of the third BWP is selected as the second target subcarrier spacing corresponding to the first BWP; for example, if the first BWP includes BWP1 and BWP2, the subcarrier spacing of BWP1 is SCS1, the subcarrier spacing of BWP2 is SCS2, and the subcarrier spacing of the third BWP is SCSack, a smallest SCS of SCS1 and SCSack is used as the second target subcarrier spacing corresponding to BWP1, and a smallest SCS of SCS2 and SCSack is used as the second target subcarrier spacing corresponding to BWP2;

determining, based on a tenth preset subcarrier spacing, the second target subcarrier spacing corresponding to the first BWP on the second CC, where the tenth preset subcarrier spacing is obtained by processing, according to the preset processing rule, the subcarrier spacing of the first BWP, the subcarrier spacing of the second BWP, and the subcarrier spacing of the third BWP; where, for example, a largest or smallest subcarrier spacing in the subcarrier spacings of the first BWPs to which the common beam information is applied, the subcarrier spacing of the second BWP, and the subcarrier spacing of the third BWP is selected as the second target subcarrier spacing corresponding to the first BWP; for example, if the first BWP includes BWP1 and BWP2, the subcarrier spacing of BWP1 is SCS1, the subcarrier spacing of BWP2 is SCS2, the subcarrier spacing of the second BWP is SCSpdcch, and the subcarrier spacing of the third BWP is SCSack, a smallest SCS of SCS1, SCSpdcch, and SCSack is used as the second target subcarrier spacing corresponding to BWP1, and a smallest SCS of SCS2, SCSpdcch, and SCSack is used as the second target subcarrier spacing corresponding to BWP2;

determining, based on an eleventh preset subcarrier spacing, a second target subcarrier spacing corresponding to a first BWP on each of the N CCs, where the eleventh preset subcarrier spacing is obtained by processing subcarrier spacings of all first BWPs on all CCs in the N CCs according to the preset processing rule; where, for example, if a BWP to which common beam information is applied is only an uplink BWP, the first BWP is an uplink BWP; or if the BWP to which common beam information is applied includes both an uplink BWP and a downlink BWP, and the first BWP includes the uplink BWP, subcarrier spacings of all the uplink BWPs on all the CCs in the N CCs are processed according to the preset processing rule to obtain the second target subcarrier spacings. For another example, if the BWP to which common beam information is applied is only a downlink BWP, the first BWP is a downlink BWP; or if the BWP to which common beam information is applied includes both an uplink BWP and a downlink BWP, and the first BWP includes the downlink BWP, subcarrier spacings of all the downlink BWPs on all the CCs in the N CCs are processed according to the preset processing rule to obtain the second target subcarrier spacings. For another example, if the BWP to which common beam information is applied includes both an uplink BWP and a downlink BWP, and the first BWP includes the uplink BWP and the downlink BWP, the subcarrier spacings of all the uplink and downlink BWPs on all the CCs in the N CCs are processed according to the preset processing rule to obtain the second target subcarrier spacings. For example, if BWPs to which the common beam information is applied are uplink BWP1 and uplink BWP2, the first BWP includes uplink BWP1 and BWP2, a subcarrier spacing of uplink BWP1 is $SCS_{UL}1$, and a subcarrier spacing of uplink BWP2 is $SCS_{UL}2$, a smallest SCS of $SCS_{UL}1$ and $SCS_{UL}2$ is used as a second target subcarrier spacing corresponding to the uplink BWP1 and also as a second target subcarrier spacing corresponding to the uplink BWP2, in other words, the second target subcarrier spacing of the uplink BWP1 and the uplink BWP2 are the same; or, if BWPs to which the common beam information is applied are uplink BWP1, uplink BWP2, downlink BWP1, and downlink BWP2, the first BWP includes uplink BWP1 and uplink BWP2, a subcarrier spacing of uplink BWP1 is $SCS_{UL}1$, and a subcarrier spacing of uplink BWP2 is $SCS_{UL}2$, a smallest SCS of $SCS_{UL}1$ and $SCS_{UL}2$ is used as a same second target subcarrier spacing corresponding to the uplink BWP1 and the uplink BWP2; or the first BWP includes downlink BWP1 and downlink BWP2, a subcarrier spacing of downlink BWP1 is $SCS_{DL}1$, and a subcarrier spacing of downlink BWP2 is $SCS_{DL}2$, a smallest SCS of $SCS_{DL}1$ and $SCS_{DL}2$ is used as a same second target subcarrier spacing corresponding to the downlink BWP1 and the downlink BWP2; or, for another example, BWPs to which the common beam information is applied are uplink BWP1, uplink BWP2, downlink BWP1, and downlink BWP2, the first BWP includes uplink BWP1, uplink BWP2, downlink BWP 1, and downlink BWP2, a subcarrier spacing of uplink BWP1 is $SCS_{UL}1$, a subcarrier spacing of uplink BWP2 is $SCS_{UL}2$, a subcarrier spacing of downlink BWP1 is $SCS_{DL}1$, and a subcarrier spacing of downlink BWP2 is $SCS_{DL}2$, a smallest SCS of $SCS_{UL}1$, $SCS_{UL}2$, $SCS_{DL}1$, and $SCS_{DL}2$ is used as a same second target subcarrier spacing corresponding to the uplink BWP1, the uplink BWP2, the downlink BWP1, and the downlink BWP2;

determining, based on a twelfth preset subcarrier spacing, the second target subcarrier spacing corresponding to the first BWP on each of the N CCs, where the twelfth preset subcarrier spacing is obtained by processing the subcarrier spacings of the first BWPs on all the CCs in the N CCs and the subcarrier spacing of the second BWP according to the preset processing rule; where, for example, if BWPs to which the common beam information is applied are uplink BWP1 and uplink BWP2, the first BWP includes uplink BWP1 and BWP2, a subcarrier spacing of uplink BWP1 is $SCS_{UL}1$, a subcarrier spacing of uplink BWP2 is $SCS_{UL}2$, and a subcarrier spacing of the second BWP is SCSpdcch, a smallest SCS of $SCS_{UL}1$, $SCS_{UL}2$, and SCSpdcch is used as a second target subcarrier spacing corresponding to the uplink BWP1 and also as a second target subcarrier spacing corresponding to the uplink BWP2, in other words, the second target subcarrier spacing of the uplink BWP1 and the uplink BWP2 are the same; or, if BWPs to which the common beam information is applied are uplink BWP1, uplink BWP2, downlink BWP1, and downlink BWP2, the first BWP includes uplink BWP1 and uplink BWP2, a subcarrier spacing of uplink BWP1 is $SCS_{UL}1$, a subcarrier spacing of uplink BWP2 is $SCS_{UL}2$, and a subcarrier spacing of the second BWP is SCSpdcch, a smallest SCS of $SCS_{UL}1$, $SCS_{UL}2$, and SCSpdcch is used as a same second target subcarrier spacing corresponding to the uplink BWP1 and the uplink BWP2; or the first BWP includes downlink BWP1 and downlink BWP2, a subcarrier spacing of downlink BWP1 is $SCS_{DL}1$, a subcarrier spacing of downlink BWP2 is $SCS_{DL}2$, and a subcarrier spacing of the second BWP is SCSpdcch, a smallest SCS of $SCS_{DL}1$, $SCS_{DL}2$, and SCSpdcch is used as a same second target subcarrier spacing corresponding to the downlink BWP1 and the downlink BWP2; or, for another example, BWPs to which the common beam information is applied are uplink BWP1, uplink BWP2, downlink BWP1, and downlink BWP2, the first BWP includes uplink BWP1, uplink BWP2, downlink BWP1, and downlink BWP2, a subcarrier spacing of uplink BWP1 is $SCS_{UL}1$, a subcarrier spacing of uplink BWP2 is $SCS_{UL}2$, a subcarrier spacing of downlink BWP1 is $SCS_{DL}1$, a subcarrier spacing of downlink BWP2 is $SCS_{DL}2$, and a subcarrier spacing of the second BWP is SCSpdcch, a smallest SCS of $SCS_{UL}1$, $SCS_{UL}2$, $SCS_{DL}1$, $SCS_{DL}2$, and SCSpdcch is used as a same second target subcarrier spacing corresponding to the uplink BWP1, the uplink BWP2, the downlink BWP1, and the downlink BWP2;

determining, based on a thirteenth preset subcarrier spacing, the second target subcarrier spacing corresponding to the first BWP on each of the N CCs, where the thirteenth preset subcarrier spacing is obtained by processing the subcarrier spacings of the first BWPs on all the CCs in the N CCs and the subcarrier spacing of the third BWP according to the preset processing rule; where, for example, if BWPs to which the common beam information is applied are uplink BWP1 and uplink BWP2, the first BWP includes uplink BWP1 and BWP2, a subcarrier spacing of uplink BWP1 is $SCS_{UL}1$, a subcarrier spacing of uplink BWP2 is $SCS_{UL}2$, and a subcarrier spacing of the third BWP is SCSack, a smallest SCS of $SCS_{UL}1$, $SCS_{UL}2$, and SCSack is used as a second target subcarrier spacing corresponding to the uplink BWP1 and also as a second target subcarrier spacing corresponding to the uplink BWP2, in other words, the second target subcarrier spacing of the uplink BWP1 and the uplink BWP2 are the same; or, if BWPs to which the common beam information is applied are uplink BWP1, uplink BWP2, downlink BWP1, and downlink BWP2, the first BWP includes uplink BWP1 and uplink BWP2, a subcarrier spacing of uplink BWP1 is $SCS_{UL}1$, a subcarrier spacing of uplink BWP2 is $SCS_{UL}2$, and a subcarrier spacing of the third BWP is SCSack, a smallest SCS of $SCS_{UL}1$, $SCS_{UL}2$, and SCSack is used as a same second target subcarrier spacing corresponding to the uplink BWP1 and the uplink BWP2; or the first BWP includes downlink BWP1 and downlink BWP2, a subcarrier spacing of downlink BWP1 is $SCS_{DL}1$, a subcarrier spacing of downlink BWP2 is $SCS_{DL}2$, and a subcarrier spacing of the third BWP is SCSack, a smallest SCS of $SCS_{DL}1$, $SCS_{DL}2$, and SCSack is used as a same second target subcarrier spacing corresponding to the downlink BWP1 and the downlink BWP2; or, for another example, BWPs to which the common beam information is applied are uplink BWP1, uplink BWP2, downlink BWP1, and downlink BWP2, the first BWP includes uplink BWP1, uplink BWP2, downlink BWP1, and downlink BWP2, a subcarrier spacing of uplink BWP1 is $SCS_{UL}1$, a subcarrier spacing of uplink BWP2 is $SCS_{UL}2$, a subcarrier spacing of downlink BWP1 is $SCS_{DL}1$, a subcarrier spacing of downlink BWP2 is $SCS_{DL}2$, and a subcarrier spacing of the third BWP is SCSack, a smallest SCS of $SCS_{UL}1$, $SCS_{UL}2$, $SCS_{DL}1$, $SCS_{DL}2$, and SCSack is used as a same second target subcarrier spacing corresponding to the uplink BWP1, the uplink BWP2, the downlink BWP1, and the downlink BWP2; or determining, based on a fourteenth preset subcarrier spacing, the second target subcarrier spacing corresponding to the first BWP on each of the N CCs, where the fourteenth preset subcarrier spacing is obtained by processing the subcarrier spacings of the first BWPs on all the CCs in the N CCs, the subcarrier spacing of the second BWP, and the subcarrier spacing of the third BWP according to the preset processing rule; where, for example, if BWPs to which the common beam information is applied are uplink BWP1 and uplink BWP2, the first BWP includes uplink BWP1 and BWP2, a subcarrier spacing of uplink BWP1 is $SCS_{UL}1$, a subcarrier spacing of uplink BWP2 is $SCS_{UL}2$, a subcarrier spacing of the second BWP is SCSpdcch, and a subcarrier spacing of the third BWP is SCSack, a smallest SCS of $SCS_{UL}1$, $SCS_{UL}2$, SCSpdcch, and SCSack is used as a second target subcarrier spacing corresponding to the uplink BWP1 and also as a second target subcarrier spacing corresponding to the uplink BWP2, in other words, the second target subcarrier spacing of the uplink BWP1 and the uplink BWP2 are the same; or, if BWPs to which the common beam information is applied are uplink BWP1, uplink BWP2, downlink BWP1, and downlink BWP2, the first BWP includes uplink BWP1 and uplink BWP2, a subcarrier spacing of uplink BWP1 is $SCS_{UL}1$, a subcarrier spacing of uplink BWP2 is $SCS_{UL}2$, a subcarrier spacing of the second BWP is SCSpdcch, and a subcarrier spacing of the third BWP is SCSack, a smallest SCS of $SCS_{UL}1$, $SCS_{UL}2$, SCSpdcch, and SCSack is used as a same second target subcarrier spacing corresponding to the uplink BWP1 and the uplink BWP2; or the first BWP includes downlink BWP1 and downlink BWP2, a subcarrier spacing of downlink BWP1 is $SCS_{DL}1$, a subcarrier spacing of downlink BWP2 is $SCS_{DL}2$, a subcarrier spacing of the second BWP is SCSpdcch, and a subcarrier spacing of the third BWP is SCSack, a smallest SCS of SCS DL 1, $SCS_{DL}2$, SCSpdcch, and SCSack is used as a same second target subcarrier spacing corresponding to the downlink BWP1 and the downlink BWP2; or, for another example, BWPs to which the common beam information is applied are uplink BWP1, uplink BWP2, downlink BWP1, and downlink BWP2, the first BWP includes uplink BWP1, uplink BWP2, downlink BWP1, and downlink BWP2, a subcarrier spacing of uplink BWP1 is $SCS_{UL}1$, a subcarrier spacing of uplink BWP2 is $SCS_{UL}2$, a subcarrier spacing of downlink BWP1 is $SCS_{DL}1$, a subcarrier spacing of downlink BWP2 is $SCS_{DL}2$, a subcarrier spacing of the second BWP is SCSpdcch, and a subcarrier spacing of the third BWP is SCSack, a smallest SCS of $SCS_{UL}1$, $SCS_{UL}2$, $SCS_{DL}1$, $SCS_{DL}2$, SCSpdcch, and SCSack is used as a same second target subcarrier spacing corresponding to the uplink BWP1, the uplink BWP2, the downlink BWP1, and the downlink BWP2.

Further optionally, the preset processing rule includes at least one of the following:

selecting a largest subcarrier spacing;

selecting a smallest subcarrier spacing;

selecting a subcarrier spacing of a CC with a smallest index;

selecting a subcarrier spacing of a CC with a largest index;

selecting a subcarrier spacing of a BWP with a smallest BWP identifier; or selecting a subcarrier spacing of a BWP with a largest BWP identifier.

For example, in a case that the terminal determines the first target subcarrier spacing according to the subcarrier spacing determining rule, the preset processing rule includes at least one of the following:

selecting a largest subcarrier spacing;

selecting a smallest subcarrier spacing;

selecting a subcarrier spacing of a CC with a smallest index; or selecting a subcarrier spacing of a CC with a largest index.

For another example, in a case that the terminal determines the second target subcarrier spacing according to the subcarrier spacing determining rule, the preset processing rule includes at least one of the following:

selecting a largest subcarrier spacing;

selecting a smallest subcarrier spacing;

selecting a subcarrier spacing of a BWP with a smallest BWP identifier; or selecting a subcarrier spacing of a BWP with a largest BWP identifier.

Optionally, the determining, by the terminal, a beam application time based on the target subcarrier spacing includes:

determining a first duration based on the target subcarrier spacing or based on the target subcarrier spacing and a fifteenth preset subcarrier spacing; and determining a beam application time based on the first duration; where The fifteenth preset subcarrier spacing is determined based on a subcarrier spacing of a CC in which an acknowledgment ACK message of the DCI is located, or based on a subcarrier spacing of a CC in which a first PDCCH is located; or the fifteenth preset subcarrier spacing is determined based on a subcarrier spacing of a second BWP or a subcarrier spacing of a third BWP, where the second BWP is a BWP in which the first PDCCH is located, the third BWP is a BWP in which the ACK message of the DCI is located, and the first PDCCH is a PDCCH carrying the DCI.

Optionally, the determining a beam application time based on the first duration includes:

determining a time unit with the first duration after a first time unit as the beam application time; where the first time unit is one of the following:

a time unit in which the DCI is located;

a time unit in which the ACK message corresponding to the DCI is located;

a time unit with a second duration after the time unit in which the DCI is located; and a time unit with the second duration after the time unit for the ACK message corresponding to the DCI.

In a specific embodiment, a first duration, for example, 28 symbols, is determined based on the target subcarrier spacing, and a time unit located 28 symbols after the first time unit is determined as the beam application time. The time unit in this embodiment of this application may be a slot, a symbol, or the like.

In another specific embodiment, the first duration is determined based on a ratio of the target subcarrier spacing to the fifteenth preset subcarrier spacing. Specifically, the target subcarrier spacing is used as the numerator, the fifteenth preset subcarrier is used as the denominator, and the two are divided to obtain a ratio. The ratio is then multiplied by d to obtain the first duration, where a correspondence is present between d and the fifteenth preset subcarrier spacing, for example, if the fifteenth preset subcarrier spacing is equal to 0, d is equal to 8 (in unit of symbols); if the fifteenth preset subcarrier spacing is 1, d is equal to 8 (in unit of symbols); and if the fifteenth preset subcarrier spacing is 2, d is equal to 14 (in unit of symbols).

In addition, during determining of the first duration based on the target subcarrier spacing and the fifteenth preset subcarrier spacing, the subcarrier spacing determining rule includes at least one of the following:

determining a subcarrier spacing of a second CC as a first target subcarrier spacing corresponding to the second CC, where the second CC is any one of the N CCs, that is, each CC corresponds to its own first target subcarrier spacing;

determining, based on a fourth preset subcarrier spacing, a first target subcarrier spacing corresponding to each of the N CCs, where the fourth preset subcarrier spacing is obtained by processing subcarrier spacings of all CCs in the N CCs according to the preset processing rule; that is, each CC corresponds to a same first target subcarrier spacing.

Alternatively, the preset subcarrier spacing determining rule includes at least one of the following:

determining a subcarrier spacing of a first BWP on a second CC as a second target subcarrier spacing corresponding to the first BWP on the second CC; that is, each first BWP corresponds to a respective second target subcarrier spacing; or determining, based on an eleventh preset subcarrier spacing, a second target subcarrier spacing corresponding to a first BWP on each of the N CCs, where the eleventh preset subcarrier spacing is obtained by processing subcarrier spacings of all first BWPs on all CCs in the N CCs according to the preset processing rule; that is, the first BWPs correspond to a same second target subcarrier spacing.

Optionally, the second duration is determined based on one of the following:

the subcarrier spacing of the CC in which the first PDCCH is located;

the subcarrier spacing of the CC in which the acknowledgment ACK message of the DCI is located;

the subcarrier spacing of the BWP in which the first PDCCH is located; and the subcarrier spacing of the BWP in which the acknowledgment ACK message of the DCI is located.

For example, if the beam application time is a first beam application time, the second duration is determined based on one of the following:

based on the subcarrier spacing of the CC in which the first PDCCH is located, determining the second duration to be Y symbols; or based on the subcarrier spacing of the CC in which the acknowledgment ACK message of the DCI is located, determining the second duration to be Y symbols.

For another example, if the beam application time is a second beam application time, the second duration is determined based on one of the following:

based on the subcarrier spacing of the BWP in which the first PDCCH is located, determining the second duration to be Y symbols; or based on the subcarrier spacing of the BWP in which the acknowledgment ACK message of the DCI is located, determining the second duration to be Y symbols.

Optionally, the determining, by the terminal, a beam application time based on the target subcarrier spacing includes:

determining, by the terminal, the beam application time based on the target subcarrier spacing in a case that a first condition is satisfied.

The first condition includes one of the following:

a fifteenth preset subcarrier spacing is different from the target subcarrier spacing; where, for example, the fifteenth preset subcarrier spacing is the subcarrier spacing SCSack of the CC in which the acknowledgement ACK message of the DCI is located, and SCSack is not equal to the target subcarrier spacing; for another example, the fifteenth preset subcarrier spacing is the subcarrier spacing SCSpdcch of the CC in which the first PDCCH is located, and SCSpdcch is not equal to the target subcarrier spacing; and the fifteenth preset subcarrier spacing is different from the target subcarrier spacing, and the fifteenth preset subcarrier spacing is less than or equal to the target subcarrier spacing; where for example, the fifteenth preset subcarrier spacing is the subcarrier spacing SCSack of the CC in which the acknowledgment ACK message of the DCI is located, and SCSack<the target subcarrier spacing; for another example, the fifteenth preset subcarrier spacing is the subcarrier spacing SCSpdcch of the CC in which the first PDCCH is located, and SCSpdcch<the target subcarrier spacing.

The fifteenth preset subcarrier spacing is determined based on a subcarrier spacing of a CC in which an acknowledgment ACK message of the DCI is located, or based on a subcarrier spacing of a CC in which a first PDCCH is located; or the fifteenth preset subcarrier spacing is determined based on a subcarrier spacing of a second BWP or a subcarrier spacing of a third BWP, where the second BWP is a BWP in which the first PDCCH is located, the third BWP is a BWP in which the ACK message of the DCI is located, and the first PDCCH is a PDCCH carrying the DCI.

In the method for determining beam application time in this embodiment of this application, after receiving the beam indication signaling, the terminal determines, according to the subcarrier spacing determining rule, the first target subcarrier spacing corresponding to the N component carriers CCs or the second target subcarrier spacing corresponding to the first bandwidth part BWP of the N CCs, and determines the first beam application time based on the first target subcarrier spacing or determines the second beam application time based on the second target subcarrier spacing, so as to determine the beam application time corresponding to the plurality of CCs or the BWPs of the plurality of CCs. This ensures consistent understanding on the beam application time between the network and the UE, which in turn can ensure beam alignment and correct data transmission.

Figure 3:
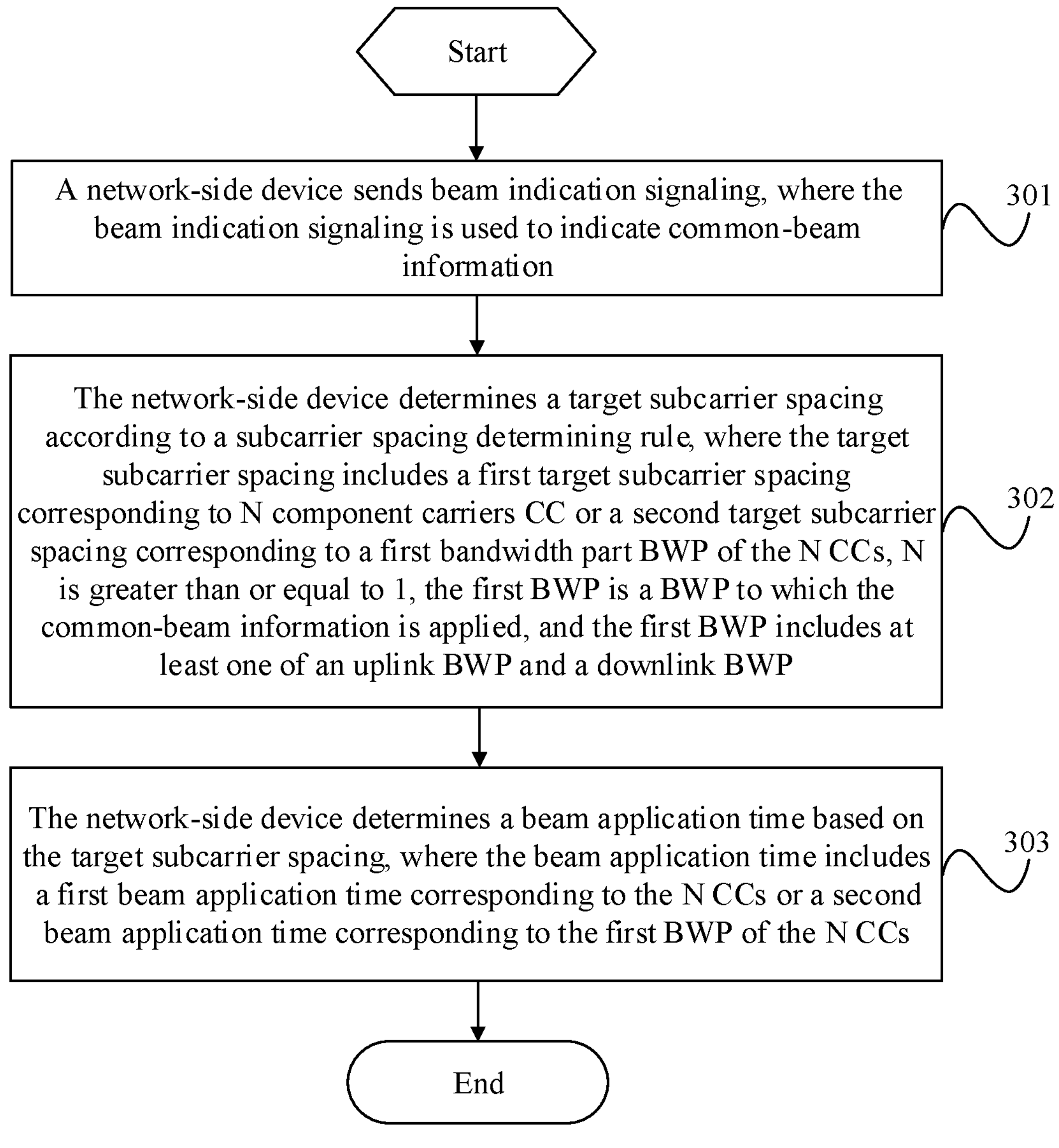
FIG. 3 is a second schematic flowchart of a method for determining beam application time according to an embodiment of this application.

As shown in FIG. 3, an embodiment of this application further provides a method for determining beam application time including the following steps.

Step 301: A network-side device sends beam indication signaling, where the beam indication signaling is used to indicate common beam information.

In this step, the beam indication signaling is used to indicate common beam information of N component carriers (Component Carrier, CC). The common beam information is used for determining beam information of all or part of channels or reference signals of the CC, for example, being used for determining beam information for terminal-dedicated reception on PDSCH (UE-dedicated reception on PDSCH), terminal-specific control resource set (UE-specific CORESET), non-terminal-specific control resource set (non-UE-specific CORESET), and PUCCH or PUSCH, where N is greater than or equal to 1.

The common beam information may be a joint TCI state or a separate TCI state. In the joint TCI state, uplink and downlink share a same TCI state, that is, sharing same beam information, and in the separate TCI state, uplink and downlink use their respective TCI states, that is, using their respective beam information.

It should be noted that the beam information in the embodiments of this application may also be referred to as: identification information of beam, spatial relation information, spatial domain transmission filter information, spatial domain reception filter information, spatial filter information, transmission configuration indicator state (TCI state) information, quasi co-location (QCL) information, or QCL parameter. Downlink beam information may usually be represented by using TCI state information or QCL information. Uplink beam information may be usually represented by using TCI state information or spatial relation information.

Step 302: The network-side device determines a target subcarrier spacing according to a subcarrier spacing determining rule, where the target subcarrier spacing includes a first target subcarrier spacing corresponding to N component carriers CCs or a second target subcarrier spacing corresponding to a first bandwidth part BWP of the N CCs, N is greater than or equal to 1, the first BWP is a BWP to which the common beam information is applied, and the first BWP includes at least one of an uplink BWP or a downlink BWP.

Step 303: The network-side device determines a beam application time based on the target subcarrier spacing, where the beam application time includes a first beam application time corresponding to the N CCs or a second beam application time corresponding to the first BWP of the N CCs.

Specifically, the first beam application time is determined based on the first target subcarrier spacing, or the second beam application time is determined based on the second target subcarrier spacing.

In the method for determining beam application time in this embodiment of this application, after sending the beam indication signaling, the network-side device determines, according to the subcarrier spacing determining rule, the first target subcarrier spacing corresponding to the N component carriers CCs or the second target subcarrier spacing corresponding to the first bandwidth part BWP of the N CCs, and determines the first beam application time based on the first target subcarrier spacing or determines the second beam application time based on the second target subcarrier spacing, so as to determine the beam application time corresponding to the plurality of CCs or the BWPs of the plurality of CCs. This ensures consistent understanding on the beam application time between the network and the UE, which in turn can ensure beam alignment and correct data transmission.

Optionally, the sending, by a network-side device, beam indication signaling includes:

- sending, by the network-side device, downlink control information DCI or a media access control control element MAC CE, where the DCI or the MAC CE carries the beam indication signaling.

For example, the beam indication signaling is sent by using a DCI format for scheduling downlink transmission (DCI format with DL assignment) or a DCI format without scheduling downlink transmission (DCI format without DL assignment), such as DCI format 1_1 or 1_2.

Optionally, the DCI or the MAC CE is not used for scheduling data transmission.

Optionally, N>1, and N CCs belong to a first CC group. The DCI or the MAC CE indicates identification information of the first CC group; or

- the DCI or the MAC CE indicates identification information of a first CC, the first CC being included in the first CC group.

In this implementation, the network configures a CC list or a CC group, where the CC list or the CC group includes a group of CCs, and the group of CCs may be CCs for intra-band carrier aggregation or CCs for inter-band carrier aggregation.

In a first optional implementation, the subcarrier spacing determining rule includes at least one of the following:

- determining a subcarrier spacing of a second CC as a first target subcarrier spacing corresponding to the second CC, where the second CC is any one of the N CCs; that is, a first target subcarrier spacing corresponding to each CC is determined according to a subcarrier spacing of each CC, for example, if a subcarrier spacing of CC1 is SCS1 and a subcarrier spacing of CC2 is SCS2, SCS1 is used as a first target subcarrier spacing corresponding to CC1, and SCS2 is used as a first target subcarrier spacing corresponding to CC2;
- determining, based on a subcarrier spacing of a CC in which a first physical downlink control channel PDCCH is located, the first target subcarrier spacing corresponding to the second CC, where the first PDCCH is a PDCCH carrying the DCI;
- determining, based on a subcarrier spacing of a CC in which an acknowledgement ACK message of the DCI is located, the first target subcarrier spacing corresponding to the second CC;
- determining, based on a first preset subcarrier spacing, the first target subcarrier spacing corresponding to the second CC, where the first preset subcarrier spacing is obtained by processing, according to a preset processing rule, the subcarrier spacing of the second CC and the subcarrier spacing of the CC in which the first PDCCH is located; for example, if the subcarrier spacing of CC1 is SCS1, the subcarrier spacing of CC2 is SCS2, and the subcarrier spacing of the CC in which the first PDCCH is located is SCSpdcch, a smallest SCS of SCS1 and SCSpdcch is used as the first target subcarrier spacing corresponding to CC1, and a smallest SCS of SCS2 and SCSpdcch is used as the first target subcarrier spacing corresponding to CC2;
- determining, based on a second preset subcarrier spacing, the first target subcarrier spacing corresponding to the second CC, where the second preset subcarrier spacing is obtained by processing, according to the preset processing rule, the subcarrier spacing of the second CC and the subcarrier spacing of the CC in which the acknowledgement ACK message of the DCI is located; for example, if the subcarrier spacing of CC1 is SCS1, the subcarrier spacing of CC2 is SCS2, and the subcarrier spacing of the CC in which the acknowledgement ACK message of the DCI is located is SCSack, a smallest SCS of SCS1 and SCSack is used as the first target subcarrier spacing corresponding to CC1, and a smallest SCS of SCS2 and SCSack is used as the first target subcarrier spacing corresponding to CC2;

determining, based on a third preset subcarrier spacing, the first target subcarrier spacing corresponding to the second CC, where the third preset subcarrier spacing is obtained by processing, according to the preset processing rule, the subcarrier spacing of the second CC, the subcarrier spacing of the CC in which the first PDCCH is located, and the subcarrier spacing of the CC in which the acknowledgement ACK message of the DCI is located; for example, a largest or smallest subcarrier spacing in the subcarrier spacing of the second CC, the subcarrier spacing of the CC in which the first PDCCH is located, and the subcarrier spacing of the CC in which the acknowledgement ACK message of the DCI is located is selected as the first target subcarrier spacing; for example, if the subcarrier spacing of CC1 is SCS1, the subcarrier spacing of CC2 is SCS2, the subcarrier spacing of the CC in which the first PDCCH is located is SCSpdcch, and the subcarrier spacing of the CC in which the acknowledgement ACK message of the DCI is located is SCSack, a smallest SCS of SCS1, SCSpdcch, and SCSack is used as the first target subcarrier spacing corresponding to CC1, and a smallest SCS of SCS2, SCSpdcch, and SCSack is used as the first target subcarrier spacing corresponding to CC2;

determining, based on a fourth preset subcarrier spacing, a first target subcarrier spacing corresponding to each of the N CCs, where the fourth preset subcarrier spacing is obtained by processing subcarrier spacings of all CCs in the N CCs according to the preset processing rule; where for example, a largest or smallest subcarrier spacing is selected from the subcarrier spacings of all the CCs in the N CCs as a same first target subcarrier spacing of each of the N CCs; for example, N=2 and the subcarrier spacing of CC1 is SCS1 and the subcarrier spacing of CC2 is SCS2, a smallest SCS of SCS1 and SCS2 is used as the first target subcarrier spacing corresponding to CC1 and also as the first target subcarrier spacing corresponding to CC2; in other words, the first target subcarrier spacings of CC1 and CC2 are the same;

determining, based on a fifth preset subcarrier spacing, the first target subcarrier spacing corresponding to each of the N CCs, where the fifth preset subcarrier spacing is obtained by processing, according to the preset processing rule, the subcarrier spacings of all the CCs in the N CCs and the subcarrier spacing of the CC in which the first PDCCH is located; for example, a largest or smallest subcarrier spacing in the subcarrier spacings of all the CCs in the N CCs and the subcarrier spacing of the CC in which the first PDCCH is located is selected as a same first target subcarrier spacing of each of the N CCs; for example, if N=2, the subcarrier spacing of CC1 is SCS1, the subcarrier spacing of CC2 is SCS2, and the subcarrier spacing of the CC in which the first PDCCH is located is SCSpdcch, a smallest SCS of SCS1, SCS2, and SCSpdcch is used as the first target subcarrier spacing corresponding to CC1 and also as the first target subcarrier spacing corresponding to CC2; in other words, the first target subcarrier spacings of CC1 and CC2 are the same;

determining, based on a sixth preset subcarrier spacing, the first target subcarrier spacing corresponding to each of the N CCs, where the sixth preset subcarrier spacing is obtained by processing, according to the preset processing rule, the subcarrier spacings of all the CCs in the N CCs and the subcarrier spacing of the CC in which the acknowledgement ACK message of the DCI is located; for example, a largest or smallest subcarrier spacing in the subcarrier spacings of all the CCs in the N CCs and the subcarrier spacing of the CC in which the acknowledgement ACK message of the DCI is located is selected as a same first target subcarrier spacing of each of the N CCs; for example, if N=2, the subcarrier spacing of CC1 is SCS1, the subcarrier spacing of CC2 is SCS2, and the subcarrier spacing of the CC in which the acknowledgement ACK message of the DCI is located is SCSack, a smallest SCS of SCS1, SCS2, and SCSack is used as the first target subcarrier spacing corresponding to CC1 and also as the first target subcarrier spacing corresponding to CC2; in other words, the first target subcarrier spacings of CC1 and CC2 are the same; or determining, based on a seventh preset subcarrier spacing, the first target subcarrier spacing corresponding to each of the N CCs, where the seventh preset subcarrier spacing is obtained by processing, according to the preset processing rule, the subcarrier spacings of all the CCs in the N CCs, the subcarrier spacing of the CC in which the first PDCCH is located, and the subcarrier spacing of the CC in which the acknowledgement ACK message of the DCI is located; for example, a largest or smallest subcarrier spacing in the subcarrier spacings of all the CCs in the N CCs, the subcarrier spacing of the CC in which the first PDCCH is located, and the subcarrier spacing of the CC in which the acknowledgement ACK message of the DCI is located is selected as a same first target subcarrier spacing of each of the N CCs; for example, if N=2, the subcarrier spacing of CC1 is SCS1, the subcarrier spacing of CC2 is SCS2, the subcarrier spacing of the CC in which the first PDCCH is located is SCSpdcch, and the subcarrier spacing of the CC in which the acknowledgement ACK message of the DCI is located is SCSack, a smallest SCS of SCS1, SCS2, SCSpdcch, and SCSack is used as the first target subcarrier spacing corresponding to CC1 and also as the first target subcarrier spacing corresponding to CC2; in other words, the first target subcarrier spacings of CC1 and CC2 are the same.

In a second optional implementation, the subcarrier spacing determining rule includes at least one of the following:

determining a subcarrier spacing of a first BWP on a second CC as a second target subcarrier spacing corresponding to the first BWP on the second CC; that is, determining a second target subcarrier spacing corresponding to each first BWP based on subcarrier spacings of first BWPs to which the common beam information is applied; where for example, if the first BWPs include BWP1 and BWP2, the subcarrier spacing of BWP1 is SCS1, and the subcarrier spacing of BWP2 is SCS2, SCS1 is used as a second target subcarrier spacing corresponding to BWP1, and SCS2 is used as a second target subcarrier spacing corresponding to BWP2;

determining, based on a subcarrier spacing of a second BWP, the second target subcarrier spacing corresponding to the first BWP on the second CC, where the second BWP is a BWP in which a first PDCCH is located, and the first PDCCH is a PDCCH carrying the DCI;

determining, based on a subcarrier spacing of a third BWP, the second target subcarrier spacing corresponding to the first BWP on the second CC, where the third BWP is a BWP in which an acknowledgement ACK message of the DCI is located;

determining, based on an eighth preset subcarrier spacing, the second target subcarrier spacing corresponding to the first BWP on the second CC, where the eighth preset subcarrier spacing is obtained by processing, according to the preset processing rule, the subcarrier spacing of the first BWP and the subcarrier spacing of the second BWP; where, for example, a largest or smallest subcarrier spacing in the subcarrier spacings of the first BWPs to which the common beam information is applied and the subcarrier spacing of the second BWP is selected as the second target subcarrier spacing corresponding to the first BWP; for example, if the first BWP includes BWP1 and BWP2, the subcarrier spacing of BWP1 is SCS1, the subcarrier spacing of BWP2 is SCS2, and the subcarrier spacing of the second BWP is SCSpdcch, a smallest SCS of SCS1 and SCSpdcch is used as the second target subcarrier spacing corresponding to BWP1, and a smallest SCS of SCS2 and SCSpdcch is used as the second target subcarrier spacing corresponding to BWP2;

determining, based on a ninth preset subcarrier spacing, the second target subcarrier spacing corresponding to the first BWP on the second CC, where the ninth preset subcarrier spacing is obtained by processing, according to the preset processing rule, the subcarrier spacing of the first BWP and the subcarrier spacing of the third BWP; where, for example, a largest or smallest subcarrier spacing in the subcarrier spacings of the first BWPs to which the common beam information is applied and the subcarrier spacing of the third BWP is selected as the second target subcarrier spacing corresponding to the first BWP; for example, if the first BWP includes BWP1 and BWP2, the subcarrier spacing of BWP1 is SCS1, the subcarrier spacing of BWP2 is SCS2, and the subcarrier spacing of the third BWP is SCSack, a smallest SCS of SCS1 and SCSack is used as the second target subcarrier spacing corresponding to BWP1, and a smallest SCS of SCS2 and SCSack is used as the second target subcarrier spacing corresponding to BWP2;

determining, based on a tenth preset subcarrier spacing, the second target subcarrier spacing corresponding to the first BWP on the second CC, where the tenth preset subcarrier spacing is obtained by processing, according to the preset processing rule, the subcarrier spacing of the first BWP, the subcarrier spacing of the second BWP, and the subcarrier spacing of the third BWP; where, for example, a largest or smallest subcarrier spacing in the subcarrier spacings of the first BWPs to which the common beam information is applied, the subcarrier spacing of the second BWP, and the subcarrier spacing of the third BWP is selected as the second target subcarrier spacing corresponding to the first BWP; for example, if the first BWP includes BWP1 and BWP2, the subcarrier spacing of BWP1 is SCS1, the subcarrier spacing of BWP2 is SCS2, the subcarrier spacing of the second BWP is SCSpdcch, and the subcarrier spacing of the third BWP is SCSack, a smallest SCS of SCS1, SCSpdcch, and SCSack is used as the second target subcarrier spacing corresponding to BWP1, and a smallest SCS of SCS2, SCSpdcch, and SCSack is used as the second target subcarrier spacing corresponding to BWP2;

determining, based on an eleventh preset subcarrier spacing, a second target subcarrier spacing corresponding to a first BWP on each of the N CCs, where the eleventh preset subcarrier spacing is obtained by processing subcarrier spacings of all first BWPs on all CCs in the N CCs according to the preset processing rule; where, for example, if a BWP to which common beam information is applied is only an uplink BWP, the first BWP is an uplink BWP; or if the BWP to which common beam information is applied includes both an uplink BWP and a downlink BWP, and the first BWP includes the uplink BWP, subcarrier spacings of all the uplink BWPs on all the CCs in the N CCs are processed according to the preset processing rule to obtain the second target subcarrier spacings. For another example, if the BWP to which common beam information is applied is only a downlink BWP, the first BWP is a downlink BWP; or if the BWP to which common beam information is applied includes both an uplink BWP and a downlink BWP, and the first BWP includes the downlink BWP, subcarrier spacings of all the downlink BWPs on all the CCs in the N CCs are processed according to the preset processing rule to obtain the second target subcarrier spacings. For another example, if the BWP to which common beam information is applied includes both an uplink BWP and a downlink BWP, and the first BWP includes the uplink BWP and the downlink BWP, the subcarrier spacings of all the uplink and downlink BWPs on all the CCs in the N CCs are processed according to the preset processing rule to obtain the second target subcarrier spacings. For example, if BWPs to which the common beam information is applied are uplink BWP1 and uplink BWP2, the first BWP includes uplink BWP1 and BWP2, a subcarrier spacing of uplink BWP1 is $SCS_{UL}1$, and a subcarrier spacing of uplink BWP2 is $SCS_{UL}2$, a smallest SCS of $SCS_{UL}1$ and $SCS_{UL}2$ is used as a second target subcarrier spacing corresponding to the uplink BWP1 and also as a second target subcarrier spacing corresponding to the uplink BWP2, in other words, the second target subcarrier spacing of the uplink BWP1 and the uplink BWP2 are the same; or, if BWPs to which the common beam information is applied are uplink BWP1, uplink BWP2, downlink BWP1, and downlink BWP2, the first BWP includes uplink BWP1 and uplink BWP2, a subcarrier spacing of uplink BWP1 is $SCS_{UL}1$, and a subcarrier spacing of uplink BWP2 is $SCS_{UL}2$, a smallest SCS of $SCS_{UL}1$ and $SCS_{UL}2$ is used as a same second target subcarrier spacing corresponding to the uplink BWP1 and the uplink BWP2; or the first BWP includes downlink BWP1 and downlink BWP2, a subcarrier spacing of downlink BWP1 is $SCS_{DL}1$ and a subcarrier spacing of downlink BWP2 is $SCS_{DL}2$, a smallest SCS of $SCS_{DL}1$ and $SCS_{DL}2$ is used as a same second target subcarrier spacing corresponding to the downlink BWP1 and the downlink BWP2; or, for another example, BWPs to which the common beam information is applied are uplink BWP1, uplink BWP2, downlink BWP1, and downlink BWP2, the first BWP includes uplink BWP1, uplink BWP2, downlink BWP1, and downlink BWP2, a subcarrier spacing of uplink BWP1 is $SCS_{UL}1$, a subcarrier spacing of uplink BWP2 is $SCS_{UL}2$, a subcarrier spacing of downlink BWP1 is $SCS_{DL}1$, and a subcarrier spacing of downlink BWP2 is $SCS_{DL}2$, a smallest SCS of $SCS_{UL}1$, $SCS_{UL}2$, $SCS_{DL}1$, and $SCS_{DL}2$ is used as a same second target subcarrier spacing corresponding to the uplink BWP1, the uplink BWP2, the downlink BWP1, and the downlink BWP2;

determining, based on a twelfth preset subcarrier spacing, the second target subcarrier spacing corresponding to the first BWP on each of the N CCs, where the twelfth preset subcarrier spacing is obtained by processing the subcarrier spacings of the first BWPs on all the CCs in the N CCs and the subcarrier spacing of the second BWP according to the preset processing rule; where, for example, if BWPs to which the common beam information is applied are uplink BWP1 and uplink BWP2, the first BWP includes uplink BWP1 and BWP2, a subcarrier spacing of uplink BWP1 is $SCS_{UL}1$, a subcarrier spacing of uplink BWP2 is $SCS_{UL}2$, and a subcarrier spacing of the second BWP is SCSpdcch, a smallest SCS of $SCS_{UL}1$, $SCS_{UL}2$, and SCSpdcch is used as a second target subcarrier spacing corresponding to the uplink BWP1 and also as a second target subcarrier spacing corresponding to the uplink BWP2, in other words, the second target subcarrier spacing of the uplink BWP1 and the uplink BWP2 are the same; or, if BWPs to which the common beam information is applied are uplink BWP1, uplink BWP2, downlink BWP1, and downlink BWP2, the first BWP includes uplink BWP1 and uplink BWP2, a subcarrier spacing of uplink BWP1 is $SCS_{UL}1$, a subcarrier spacing of uplink BWP2 is $SCS_{UL}2$, and a subcarrier spacing of the second BWP is SCSpdcch, a smallest SCS of $SCS_{UL}1$, $SCS_{UL}2$, and SCSpdcch is used as a same second target subcarrier spacing corresponding to the uplink BWP1 and the uplink BWP2; or the first BWP includes downlink BWP1 and downlink BWP2, a subcarrier spacing of downlink BWP1 is $SCS_{DL}1$, a subcarrier spacing of downlink BWP2 is $SCS_{DL}2$, and a subcarrier spacing of the second BWP is SCSpdcch, a smallest SCS of $SCS_{DL}1$, $SCS_{DL}2$, and SCSpdcch is used as a same second target subcarrier spacing corresponding to the downlink BWP1 and the downlink BWP2; or, for another example, BWPs to which the common beam information is applied are uplink BWP1, uplink BWP2, downlink BWP1, and downlink BWP2, the first BWP includes uplink BWP1, uplink BWP2, downlink BWP1, and downlink BWP2, a subcarrier spacing of uplink BWP1 is $SCS_{UL}1$, a subcarrier spacing of uplink BWP2 is $SCS_{UL}2$, a subcarrier spacing of downlink BWP1 is $SCS_{DL}1$, a subcarrier spacing of downlink BWP2 is $SCS_{DL}2$, and a subcarrier spacing of the second BWP is SCSpdcch, a smallest SCS of $SCS_{UL}1$, $SCS_{UL}2$, $SCS_{DL}1$, $SCS_{DL}2$, and SCSpdcch is used as a same second target subcarrier spacing corresponding to the uplink BWP1, the uplink BWP2, the downlink BWP1, and the downlink BWP2;

determining, based on a thirteenth preset subcarrier spacing, the second target subcarrier spacing corresponding to the first BWP on each of the N CCs, where the thirteenth preset subcarrier spacing is obtained by processing the subcarrier spacings of the first BWPs on all the CCs in the N CCs and the subcarrier spacing of the third BWP according to the preset processing rule; where, for example, if BWPs to which the common beam information is applied are uplink BWP1 and uplink BWP2, the first BWP includes uplink BWP1 and BWP2, a subcarrier spacing of uplink BWP1 is $SCS_{UL}1$, a subcarrier spacing of uplink BWP2 is $SCS_{UL}2$, and a subcarrier spacing of the third BWP is SCSack, a smallest SCS of $SCS_{UL}1$, $SCS_{UL}2$, and SCSack is used as a second target subcarrier spacing corresponding to the uplink BWP1 and also as a second target subcarrier spacing corresponding to the uplink BWP2, in other words, the second target subcarrier spacing of the uplink BWP1 and the uplink BWP2 are the same; or, if BWPs to which the common beam information is applied are uplink BWP1, uplink BWP2, downlink BWP1, and downlink BWP2, the first BWP includes uplink BWP1 and uplink BWP2, a subcarrier spacing of uplink BWP1 is $SCS_{UL}1$, a subcarrier spacing of uplink BWP2 is $SCS_{UL}2$, and a subcarrier spacing of the third BWP is SCSack, a smallest SCS of $SCS_{UL}1$, $SCS_{UL}2$, and SCSack is used as a same second target subcarrier spacing corresponding to the uplink BWP1 and the uplink BWP2; or the first BWP includes downlink BWP1 and downlink BWP2, a subcarrier spacing of downlink BWP1 is $SCS_{DL}1$, a subcarrier spacing of downlink BWP2 is $SCS_{DL}2$, and a subcarrier spacing of the third BWP is SCSack, a smallest SCS of $SCS_{DL}1$, $SCS_{DL}2$, and SCSack is used as a same second target subcarrier spacing corresponding to the downlink BWP1 and the downlink BWP2; or, for another example, BWPs to which the common beam information is applied are uplink BWP1, uplink BWP2, downlink BWP1, and downlink BWP2, the first BWP includes uplink BWP1, uplink BWP2, downlink BWP1, and downlink BWP2, a subcarrier spacing of uplink BWP1 is $SCS_{UL}1$, a subcarrier spacing of uplink BWP2 is $SCS_{UL}2$, a subcarrier spacing of downlink BWP1 is $SCS_{DL}1$, a subcarrier spacing of downlink BWP2 is $SCS_{DL}2$, and a subcarrier spacing of the third BWP is SCSack, a smallest SCS of $SCS_{UL}1$, $SCS_{UL}2$, $SCS_{DL}1$, $SCS_{DL}2$, and SCSack is used as a same second target subcarrier spacing corresponding to the uplink BWP1, the uplink BWP2, the downlink BWP1, and the downlink BWP2; or determining, based on a fourteenth preset subcarrier spacing, the second target subcarrier spacing corresponding to the first BWP on each of the N CCs, where the fourteenth preset subcarrier spacing is obtained by processing the subcarrier spacings of the first BWPs on all the CCs in the N CCs, the subcarrier spacing of the second BWP, and the subcarrier spacing of the third BWP according to the preset processing rule; where, for example, if BWPs to which the common beam information is applied are uplink BWP1 and uplink BWP2, the first BWP includes uplink BWP1 and BWP2, a subcarrier spacing of uplink BWP1 is $SCS_{UL}1$, a subcarrier spacing of uplink BWP2 is $SCS_{UL}2$, a subcarrier spacing of the second BWP is SCSpdcch, and a subcarrier spacing of the third BWP is SCSack, a smallest SCS of $SCS_{UL}1$, $SCS_{UL}2$, SCSpdcch, and SCSack is used as a second target subcarrier spacing corresponding to the uplink BWP1 and also as a second target subcarrier spacing corresponding to the uplink BWP2, in other words, the second target subcarrier spacing of the uplink BWP1 and the uplink BWP2 are the same; or, if BWPs to which the common beam information is applied are uplink BWP1, uplink BWP2, downlink BWP1, and downlink BWP2, the first BWP includes uplink BWP1 and uplink BWP2, a subcarrier spacing of uplink BWP1 is $SCS_{UL}1$, a subcarrier spacing of uplink BWP2 is $SCS_{UL}2$, a subcarrier spacing of the second BWP is SCSpdcch, and a subcarrier spacing of the third BWP is SCSack, a smallest SCS of $SCS_{UL}1$, $SCS_{UL}2$, SCSpdcch, and SCSack is used as a same second target subcarrier spacing corresponding to the uplink BWP1 and the uplink BWP2; or the first BWP includes downlink BWP1 and downlink BWP2, a subcarrier spacing of downlink BWP1 is $SCS_{DL}1$, a subcarrier spacing of downlink BWP2 is $SCS_{DL}2$, a subcarrier spacing of the second BWP is SCSpdcch, and a subcarrier spacing of the third BWP is SCSack, a smallest SCS of $SCS_{DL}1$, $SCS_{DL}2$, SCSpdcch, and SCSack is used as a same second target subcarrier spacing corresponding to the downlink BWP1 and the downlink BWP2; or, for another example, BWPs to which the common beam information is applied are uplink BWP1, uplink BWP2, downlink BWP1, and downlink BWP2, the first BWP includes uplink BWP1, uplink BWP2, downlink BWP1, and downlink BWP2, a subcarrier spacing of uplink BWP1 is $SCS_{UL}1$, a subcarrier spacing of uplink BWP2 is $SCS_{UL}2$, a subcarrier spacing of downlink BWP1 is $SCS_{DL}1$, a subcarrier spacing of downlink BWP2 is $SCS_{DL}2$, a subcarrier spacing of the second BWP is SCSpdcch, and a subcarrier spacing of the third BWP is SCSack, a smallest SCS of $SCS_{UL}1$, $SCS_{UL}2$, $SCS_{DL}1$, $SCS_{DL}2$, SCSpdcch, and SCSack is used as a same second target subcarrier spacing corresponding to the uplink BWP1, the uplink BWP2, the downlink BWP1, and the downlink BWP2.

Optionally, the preset processing rule includes at least one of the following:

selecting a largest subcarrier spacing;

selecting a smallest subcarrier spacing;

selecting a subcarrier spacing of a CC with a smallest index;

selecting a subcarrier spacing of a CC with a largest index;

selecting a subcarrier spacing of a BWP with a smallest BWP identifier; or selecting a subcarrier spacing of a BWP with a largest BWP identifier.

Optionally, the determining, by the network-side device, a beam application time based on the target subcarrier spacing includes:

determining a first duration based on the target subcarrier spacing or based on the target subcarrier spacing and a fifteenth preset subcarrier spacing; and determining a beam application time based on the first duration.

The fifteenth preset subcarrier spacing is determined based on a subcarrier spacing of a CC in which an acknowledgment ACK message of the DCI is located, or based on a subcarrier spacing of a CC in which a first PDCCH is located; or the fifteenth preset subcarrier spacing is determined based on a subcarrier spacing of a second BWP or a subcarrier spacing of a third BWP, where the second BWP is a BWP in which the first PDCCH is located, the third BWP is a BWP in which the ACK message of the DCI is located, and the first PDCCH is a PDCCH carrying the DCI.

Optionally, the determining a beam application time based on the first duration includes:

determining a time unit with the first duration after a first time unit as the beam application time; where the first time unit is one of the following:

a time unit in which the DCI is located;

a time unit in which the ACK message corresponding to the DCI is located;

a time unit with a second duration after the time unit in which the DCI is located; and a time unit with the second duration after the time unit for the ACK message corresponding to the DCI.

Optionally, the determining the first duration based on a ratio of the target subcarrier spacing to the fifteenth preset subcarrier spacing includes:

determining the first duration based on a ratio of the target subcarrier spacing to the fifteenth preset subcarrier spacing.

Optionally, the second duration is determined based on one of the following:

the subcarrier spacing of the CC in which the first PDCCH is located;

the subcarrier spacing of the CC in which the acknowledgment ACK message of the DCI is located;

the subcarrier spacing of the BWP in which the first PDCCH is located; and the subcarrier spacing of the BWP in which the acknowledgment ACK message of the DCI is located.

Optionally, the determining, by the network-side device, a beam application time based on the target subcarrier spacing includes:

determining, by the network-side device, the beam application time based on the target subcarrier spacing in a case that a first condition is satisfied.

The first condition includes one of the following:

a fifteenth preset subcarrier spacing is different from the target subcarrier spacing; where, for example, the fifteenth preset subcarrier spacing is the subcarrier spacing SCSack of the CC in which the acknowledgement ACK message of the DCI is located, and SCSack is not equal to the target subcarrier spacing; for another example, the fifteenth preset subcarrier spacing is the subcarrier spacing SCSpdcch of the CC in which the first PDCCH is located, and SCSpdcch is not equal to the target subcarrier spacing; and the fifteenth preset subcarrier spacing is different from the target subcarrier spacing, and the fifteenth preset subcarrier spacing is less than or equal to the target subcarrier spacing; where for example, the fifteenth preset subcarrier spacing is the subcarrier spacing SCSack of the CC in which the acknowledgment ACK message of the DCI is located, and SCSack<the target subcarrier spacing; for another example, the fifteenth preset subcarrier spacing is the subcarrier spacing SCSpdcch of the CC in which the first PDCCH is located, and SCSpdcch<the target subcarrier spacing.

The fifteenth preset subcarrier spacing is determined based on a subcarrier spacing of a CC in which an acknowledgment ACK message of the DCI is located, or based on a subcarrier spacing of a CC in which a first PDCCH is located; or the fifteenth preset subcarrier spacing is determined based on a subcarrier spacing of a second BWP or a subcarrier spacing of a third BWP, where the second BWP is a BWP in which the first PDCCH is located, the third BWP is a BWP in which the ACK message of the DCI is located, and the first PDCCH is a PDCCH carrying the DCI.

In the method for determining beam application time in this embodiment of this application, after sending the beam indication signaling, the network-side device determines, according to the subcarrier spacing determining rule, the first target subcarrier spacing corresponding to the N component carriers CCs or the second target subcarrier spacing corresponding to the first bandwidth part BWP of the N CCs, and determines the first beam application time based on the first target subcarrier spacing or determines the second beam application time based on the second target subcarrier spacing, so as to determine the beam application time corresponding to the plurality of CCs or the BWPs of the plurality of CCs. This ensures consistent understanding on the beam application time between the network and the UE, which in turn can ensure beam alignment and correct data transmission.

It should be noted that, for the method for determining beam application time provided in the embodiments of this application, the execution body may be an apparatus for determining beam application time, or a control module for executing the method for determining beam application time in the apparatus for determining beam application time. In the embodiments of this application, the method for determining beam application time being performed by the apparatus for determining beam application time is used as an example to describe the apparatus for determining beam application time provided in the embodiments of this application.

Figure 4:
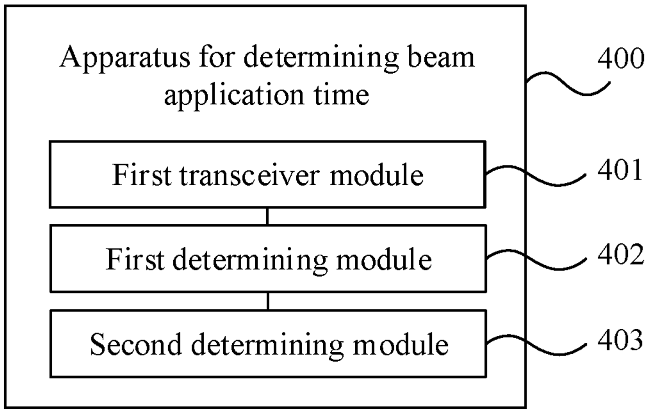
FIG. 4 is a first schematic modular diagram of an apparatus for determining beam application time according to an embodiment of this application.

As shown in FIG. 4, an embodiment of this application provides an apparatus 400 for determining beam application time including:

a first transceiver module 401, configured to receive beam indication signaling, where the beam indication signaling is used to indicate common beam information;

a first determining module 402 configured to determine a target subcarrier spacing according to a subcarrier spacing determining rule, where the target subcarrier spacing includes a first target subcarrier spacing corresponding to N component carriers CCs or a second target subcarrier spacing corresponding to a first bandwidth part BWP of the N CCs, N is greater than or equal to 1, the first BWP is a BWP to which the common beam information is applied, and the first BWP includes at least one of an uplink BWP or a downlink BWP; and a second determining module 403 configured to determine a beam application time based on the target subcarrier spacing, where the beam application time includes a first beam application time corresponding to the N CCs or a second beam application time corresponding to the first BWP of the N CCs.

Optionally, the first transceiver module is configured to receive downlink control information DCI or a media access control control element MAC CE, where the DCI or the MAC CE carries the beam indication signaling.

Optionally, the DCI or the MAC CE is not used for scheduling data transmission.

Optionally, N>1, and N CCs belong to a first CC group.

The DCI or the MAC CE indicates identification information of the first CC group; or the DCI or the MAC CE indicates identification information of a first CC, the first CC being included in the first CC group.

Optionally, the subcarrier spacing determining rule includes at least one of the following:

determining a subcarrier spacing of a second CC as a first target subcarrier spacing corresponding to the second CC, where the second CC is any one of the N CCs;

determining, based on a subcarrier spacing of a CC in which a first physical downlink control channel PDCCH is located, the first target subcarrier spacing corresponding to the second CC, where the first PDCCH is a PDCCH carrying the DCI;

determining, based on a subcarrier spacing of a CC in which an acknowledgement ACK message of the DCI is located, the first target subcarrier spacing corresponding to the second CC;

determining, based on a first preset subcarrier spacing, the first target subcarrier spacing corresponding to the second CC, where the first preset subcarrier spacing is obtained by processing, according to a preset processing rule, the subcarrier spacing of the second CC and the subcarrier spacing of the CC in which the first PDCCH is located;

determining, based on a second preset subcarrier spacing, the first target subcarrier spacing corresponding to the second CC, where the second preset subcarrier spacing is obtained by processing, according to a preset processing rule, the subcarrier spacing of the second CC and the subcarrier spacing of the CC in which the acknowledgement ACK message of the DCI is located;

determining, based on a third preset subcarrier spacing, the first target subcarrier spacing corresponding to the second CC, where the third preset subcarrier spacing is obtained by processing, according to the preset processing rule, the subcarrier spacing of the second CC, the subcarrier spacing of the CC in which the first PDCCH is located, and the subcarrier spacing of the CC in which the acknowledgement ACK message of the DCI is located;

determining, based on a fourth preset subcarrier spacing, a first target subcarrier spacing corresponding to each of the N CCs, where the fourth preset subcarrier spacing is obtained by processing subcarrier spacings of all CCs in the N CCs according to the preset processing rule;

determining, based on a fifth preset subcarrier spacing, the first target subcarrier spacing corresponding to each of the N CCs, where the fifth preset subcarrier spacing is obtained by processing, according to the preset processing rule, the subcarrier spacings of all the CCs in the N CCs and the subcarrier spacing of the CC in which the first PDCCH is located;

determining, based on a sixth preset subcarrier spacing, the first target subcarrier spacing corresponding to each of the N CCs, where the sixth preset subcarrier spacing is obtained by processing, according to the preset processing rule, the subcarrier spacings of all the CCs in the N CCs and the subcarrier spacing of the CC in which the acknowledgement ACK message of the DCI is located; or determining, based on a seventh preset subcarrier spacing, the first target subcarrier spacing corresponding to each of the N CCs, where the seventh preset subcarrier spacing is obtained by processing, according to the preset processing rule, the subcarrier spacings of all the CCs in the N CCs, the subcarrier spacing of the CC in which the first PDCCH is located, and the subcarrier spacing of the CC in which the acknowledgement ACK message of the DCI is located.

Optionally, the subcarrier spacing determining rule includes at least one of the following:

determining a subcarrier spacing of a first BWP on a second CC as a second target subcarrier spacing corresponding to the first BWP on the second CC;

determining, based on a subcarrier spacing of a second BWP, the second target subcarrier spacing corresponding to the first BWP on the second CC, where the second BWP is a BWP in which a first PDCCH is located, and the first PDCCH is a PDCCH carrying the DCI;

determining, based on a subcarrier spacing of a third BWP, the second target subcarrier spacing corresponding to the first BWP on the second CC, where the third BWP is a BWP in which an acknowledgement ACK message of the DCI is located;

determining, based on an eighth preset subcarrier spacing, the second target subcarrier spacing corresponding to the first BWP on the second CC, where the eighth preset subcarrier spacing is obtained by processing, according to the preset processing rule, the subcarrier spacing of the first BWP and the subcarrier spacing of the second BWP;

determining, based on a ninth preset subcarrier spacing, the second target subcarrier spacing corresponding to the first BWP on the second CC, where the ninth preset subcarrier spacing is obtained by processing, according to the preset processing rule, the subcarrier spacing of the first BWP and the subcarrier spacing of the third BWP;

determining, based on a tenth preset subcarrier spacing, the second target subcarrier spacing corresponding to the first BWP on the second CC, where the tenth preset subcarrier spacing is obtained by processing, according to the preset processing rule, the subcarrier spacing of the first BWP, the subcarrier spacing of the second BWP, and the subcarrier spacing of the third BWP;

determining, based on an eleventh preset subcarrier spacing, a second target subcarrier spacing corresponding to a first BWP on each of the N CCs, where the eleventh preset subcarrier spacing is obtained by processing subcarrier spacings of all first BWPs on all CCs in the N CCs according to the preset processing rule;

determining, based on a twelfth preset subcarrier spacing, the second target subcarrier spacing corresponding to the first BWP on each of the N CCs, where the twelfth preset subcarrier spacing is obtained by processing the subcarrier spacings of the first BWPs on all the CCs in the N CCs and the subcarrier spacing of the second BWP according to the preset processing rule;

determining, based on a thirteenth preset subcarrier spacing, the second target subcarrier spacing corresponding to the first BWP on each of the N CCs, where the thirteenth preset subcarrier spacing is obtained by processing the subcarrier spacings of the first BWPs on all the CCs in the N CCs and the subcarrier spacing of the third BWP according to the preset processing rule; or determining, based on a fourteenth preset subcarrier spacing, the second target subcarrier spacing corresponding to the first BWP on each of the N CCs, where the fourteenth preset subcarrier spacing is obtained by processing the subcarrier spacings of the first BWPs on all the CCs in the N CCs, the subcarrier spacing of the second BWP, and the subcarrier spacing of the third BWP according to the preset processing rule.

Optionally, the preset processing rule includes at least one of the following:

selecting a largest subcarrier spacing;

selecting a smallest subcarrier spacing;

selecting a subcarrier spacing of a CC with a smallest index;

selecting a subcarrier spacing of a CC with a largest index;

selecting a subcarrier spacing of a BWP with a smallest BWP identifier; or selecting a subcarrier spacing of a BWP with a largest BWP identifier.

Optionally, the second determining module includes:

a first determining submodule, configured to determine a first duration based on the target subcarrier spacing or based on the target subcarrier spacing and a fifteenth preset subcarrier spacing; and a second determining submodule, configured to determine a beam application time based on the first duration.

The fifteenth preset subcarrier spacing is determined based on a subcarrier spacing of a CC in which an acknowledgment ACK message of the DCI is located, or based on a subcarrier spacing of a CC in which a first PDCCH is located; or the fifteenth preset subcarrier spacing is determined based on a subcarrier spacing of a second BWP or a subcarrier spacing of a third BWP, where the second BWP is a BWP in which the first PDCCH is located, the third BWP is a BWP in which the ACK message of the DCI is located, and the first PDCCH is a PDCCH carrying the DCI.

Optionally, the second determining submodule is configured to determine a time unit with the first duration after a first time unit as the beam application time; where the first time unit is one of the following:

a time unit in which the DCI is located;

a time unit in which the ACK message corresponding to the DCI is located;

a time unit with a second duration after the time unit in which the DCI is located; and a time unit with the second duration after the time unit for the ACK message corresponding to the DCI.

Optionally, the first determining submodule is configured to determine the first duration based on a ratio of the target subcarrier spacing to the fifteenth preset subcarrier spacing.

Optionally, the second duration is determined based on one of the following:

the subcarrier spacing of the CC in which the first PDCCH is located;

the subcarrier spacing of the CC in which the acknowledgment ACK message of the DCI is located;

the subcarrier spacing of the BWP in which the first PDCCH is located; and the subcarrier spacing of the BWP in which the acknowledgment ACK message of the DCI is located.

Optionally, the second determining module is configured to determine, for the terminal, the beam application time based on the target subcarrier spacing in a case that a first condition is satisfied.

The first condition includes one of the following:

a fifteenth preset subcarrier spacing is different from the target subcarrier spacing; and the fifteenth preset subcarrier spacing is different from the target subcarrier spacing, and the fifteenth preset subcarrier spacing is less than or equal to the target subcarrier spacing.

The fifteenth preset subcarrier spacing is determined based on a subcarrier spacing of a CC in which an acknowledgment ACK message of the DCI is located, or based on a subcarrier spacing of a CC in which a first PDCCH is located; or the fifteenth preset subcarrier spacing is determined based on a subcarrier spacing of a second BWP or a subcarrier spacing of a third BWP, where the second BWP is a BWP in which the first PDCCH is located, the third BWP is a BWP in which the ACK message of the DCI is located, and the first PDCCH is a PDCCH carrying the DCI.

In the apparatus for determining beam application time in this embodiment of this application, after receiving the beam indication signaling, the terminal determines, according to the subcarrier spacing determining rule, the first target subcarrier spacing corresponding to the N component carriers CCs or the second target subcarrier spacing corresponding to the first bandwidth part BWP of the N CCs, and determines the first beam application time based on the first target subcarrier spacing or determines the second beam application time based on the second target subcarrier spacing, so as to determine the beam application time corresponding to the plurality of CCs or the BWPs of the plurality of CCs. This ensures consistent understanding on the beam application time between the network and the UE, which in turn can ensure beam alignment and correct data transmission.

The apparatus for determining beam application time in this embodiment of this application may be an apparatus, or an apparatus or electric device having an operating system, or may be a component, an integrated circuit, or a chip in the terminal. The apparatus or electric device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The apparatus provided in this embodiment of this application is capable of implementing the processes implemented in the method embodiment in FIG. 2, with the same technical effects achieved. To avoid repetition, details are not described herein again.

Figure 5:
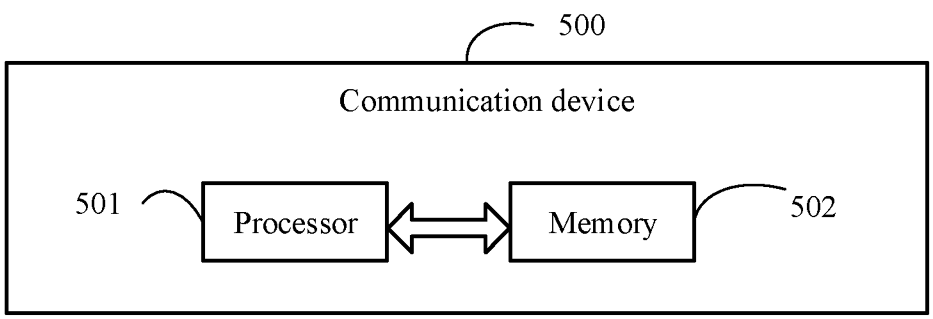
FIG. 5 is a structural block diagram of a communication device according to an embodiment of this application.

Optionally, as shown in FIG. 5, an embodiment of this application further provides a communication device 500, including a processor 501, a memory 502, and a program or instructions stored in the memory 502 and capable of running on the processor 501. For example, when the communication device 500 is a terminal and when the program or instructions are executed by the processor 501, the processes of the foregoing embodiment of the method for determining beam application time applied to the terminal are implemented, with the same technical effects achieved. When the communication device 500 is a network-side device and when the program or instructions are executed by the processor 501, the processes of the foregoing embodiment of the method for determining beam application time applied to the network-side device are implemented, with the same technical effects achieved. To avoid repetition, details are not described herein again.

An embodiment of this application further provides a terminal, including a processor and a communication interface. The communication interface is configured to receive beam indication signaling, where the beam indication signaling is used to indicate common beam information. The processor is configured to determine a target subcarrier spacing according to a subcarrier spacing determining rule, where the target subcarrier spacing includes a first target subcarrier spacing corresponding to N component carriers CCs or a second target subcarrier spacing corresponding to a first bandwidth part BWP of the N CCs, N is greater than or equal to 1, the first BWP is a BWP to which the common beam information is applied, and the first BWP includes at least one of an uplink BWP or a downlink BWP; and determine a beam application time based on the target subcarrier spacing, where the beam application time includes a first beam application time corresponding to the N CCs or a second beam application time corresponding to the first BWP of the N CCs.

Figure 6:
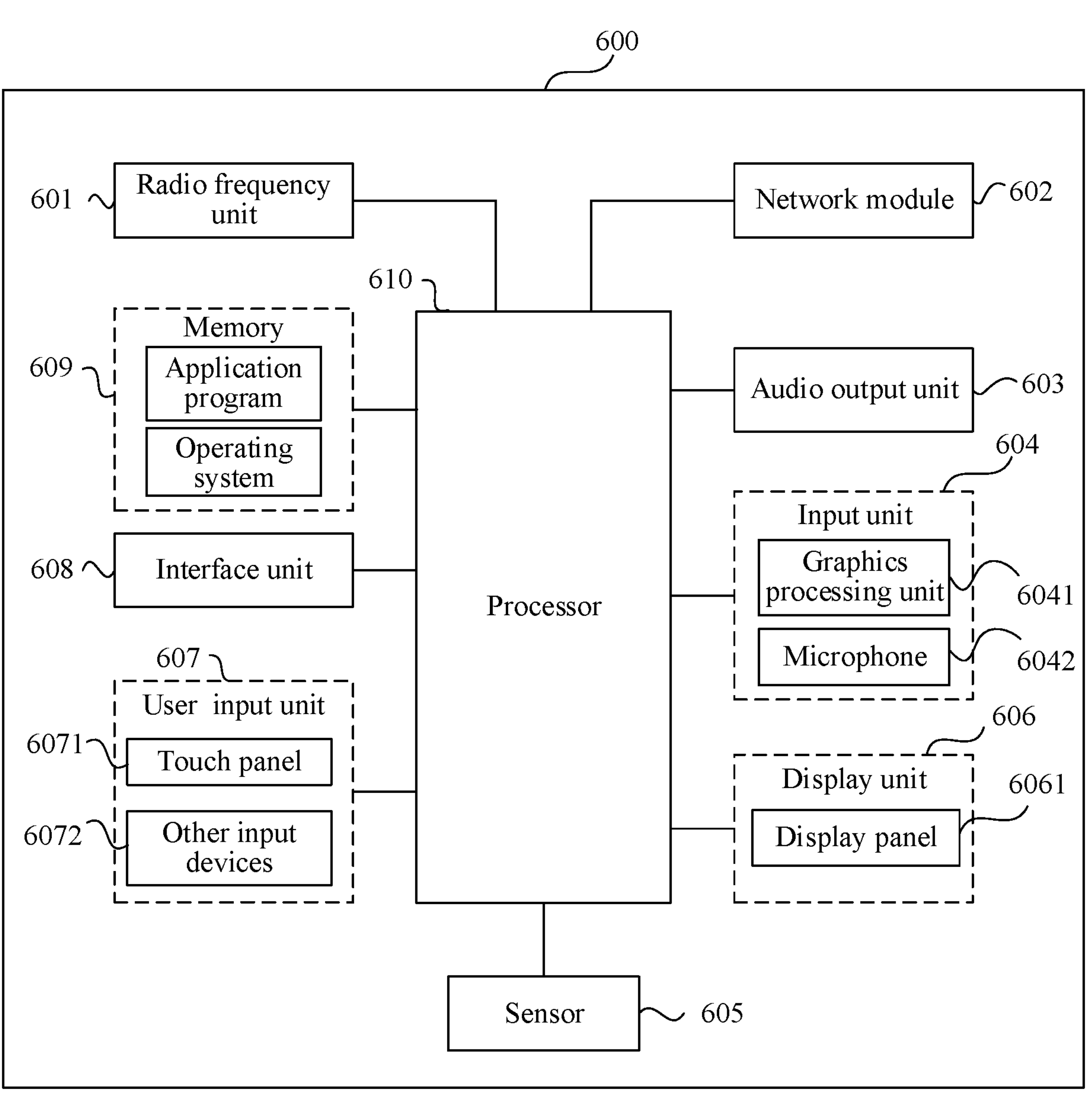
FIG. 6 is a structural block diagram of a terminal according to an embodiment of this application.

The terminal embodiments correspond to the foregoing terminal-side method embodiments, and the implementation processes and implementations of the foregoing method embodiments can be applied to the terminal embodiments, with the same technical effects achieved. Specifically, FIG. 6 is a schematic structural diagram of hardware of a terminal for implementing the embodiments of this application. The terminal 600 includes but is not limited to at least part of components such as a radio frequency unit 601, a network module 602, an audio output unit 603, an input unit 604, a sensor 605, a display unit 606, a user input unit 607, an interface unit 608, a memory 609, and a processor 610.

Persons skilled in the art can understand that the terminal 600 may further include a power supply (for example, a battery) supplying power to the components, and the power supply may be logically connected to the processor 610 through a power management system. In this way, functions such as charge management, discharge management, and power consumption management are implemented by using the power management system. The structure of the terminal shown in FIG. 6 does not constitute any limitation on the terminal. The terminal may include more or fewer components than shown in the figure, or a combination of some components, or the components disposed differently. Details are not described herein again.

It can be understood that in this embodiment of this application, the input unit 604 may include a graphics processing unit (GPU) 6041 and a microphone 6042. The graphics processing unit 6041 processes image data of a still picture or video obtained by an image capture apparatus (such as a camera) in a video capture mode or an image capture mode. The display unit 606 may include a display panel 6061, and the display panel 6061 may be configured in a form of a liquid crystal display, an organic light-emitting diode, and the like. The user input unit 607 may include a touch panel 6071 and other input devices 6072. The touch panel 6071 is also referred to as a touchscreen. The touch panel 6071 may include two parts: a touch detection apparatus and a touch controller. The other input devices 6072 may include but are not limited to a physical keyboard, a function key (such as a volume control key or a power on/off key), a trackball, a mouse, a joystick, and the like. Details are not described herein.

In this embodiment of this application, the radio frequency unit 601 receives downlink data from a network-side device, and then sends the downlink data to the processor 610 for processing; and also sends uplink data to the network-side device. Generally, the radio frequency unit 601 includes but is not limited to an antenna, at least one amplifier, a transceiver, a coupler, a low noise amplifier, a duplexer, and the like.

The memory 609 may be configured to store software programs or instructions and various data. The memory 609 may include a program or instruction storage area and a data storage area. The program or instruction storage area may store an operating system, an application program or instruction required by at least one function (for example, a sound playback function or an image playback function), and the like. In addition, the memory 609 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another volatile solid-state storage device.

The processor 610 may include one or more processing units. Optionally, an application processor and a modem processor may be integrated in the processor 610. The application processor primarily processes an operating system, user interfaces, application programs or instructions, and the like. The modem processor primarily processes radio communication, for example, being a baseband processor. It can be understood that the modem processor may alternatively be not integrated in the processor 610.

The radio frequency unit 601 is configured to receive beam indication signaling, where the beam indication signaling is used to indicate common beam information.

The processor 610 is configured to determine, for the terminal, a target subcarrier spacing according to a subcarrier spacing determining rule, where the target subcarrier spacing includes a first target subcarrier spacing corresponding to N component carriers CCs or a second target subcarrier spacing corresponding to a first bandwidth part BWP of the N CCs, N is greater than or equal to 1, the first BWP is a BWP to which the common beam information is applied, and the first BWP includes at least one of an uplink BWP or a downlink BWP; and determine a beam application time based on the target subcarrier spacing, where the beam application time includes a first beam application time corresponding to the N CCs or a second beam application time corresponding to the first BWP of the N CCs.

Optionally, the radio frequency unit 601 is configured to receive downlink control information DCI or a media access control control element MAC CE, where the DCI or the MAC CE carries the beam indication signaling.

Optionally, the DCI or the MAC CE is not used for scheduling data transmission.

Optionally, N>1, and N CCs belong to a first CC group.

The DCI or the MAC CE indicates identification information of the first CC group; or the DCI or the MAC CE indicates identification information of a first CC, the first CC being included in the first CC group.

Optionally, the subcarrier spacing determining rule includes at least one of the following:

determining a subcarrier spacing of a second CC as a first target subcarrier spacing corresponding to the second CC, where the second CC is any one of the N CCs;

determining, based on a subcarrier spacing of a CC in which a first physical downlink control channel PDCCH is located, the first target subcarrier spacing corresponding to the second CC, where the first PDCCH is a PDCCH carrying the DCI;

determining, based on a subcarrier spacing of a CC in which an acknowledgement ACK message of the DCI is located, the first target subcarrier spacing corresponding to the second CC;

determining, based on a first preset subcarrier spacing, the first target subcarrier spacing corresponding to the second CC, where the first preset subcarrier spacing is obtained by processing, according to a preset processing rule, the subcarrier spacing of the second CC and the subcarrier spacing of the CC in which the first PDCCH is located;

determining, based on a second preset subcarrier spacing, the first target subcarrier spacing corresponding to the second CC, where the second preset subcarrier spacing is obtained by processing, according to a preset processing rule, the subcarrier spacing of the second CC and the subcarrier spacing of the CC in which the acknowledgement ACK message of the DCI is located;

determining, based on a third preset subcarrier spacing, the first target subcarrier spacing corresponding to the second CC, where the third preset subcarrier spacing is obtained by processing, according to the preset processing rule, the subcarrier spacing of the second CC, the subcarrier spacing of the CC in which the first PDCCH is located, and the subcarrier spacing of the CC in which the acknowledgement ACK message of the DCI is located;

determining, based on a fourth preset subcarrier spacing, a first target subcarrier spacing corresponding to each of the N CCs, where the fourth preset subcarrier spacing is obtained by processing subcarrier spacings of all CCs in the N CCs according to the preset processing rule;

determining, based on a fifth preset subcarrier spacing, the first target subcarrier spacing corresponding to each of the N CCs, where the fifth preset subcarrier spacing is obtained by processing, according to the preset processing rule, the subcarrier spacings of all the CCs in the N CCs and the subcarrier spacing of the CC in which the first PDCCH is located;

determining, based on a sixth preset subcarrier spacing, the first target subcarrier spacing corresponding to each of the N CCs, where the sixth preset subcarrier spacing is obtained by processing, according to the preset processing rule, the subcarrier spacings of all the CCs in the N CCs and the subcarrier spacing of the CC in which the acknowledgement ACK message of the DCI is located; or determining, based on a seventh preset subcarrier spacing, the first target subcarrier spacing corresponding to each of the N CCs, where the seventh preset subcarrier spacing is obtained by processing, according to the preset processing rule, the subcarrier spacings of all the CCs in the N CCs, the subcarrier spacing of the CC in which the first PDCCH is located, and the subcarrier spacing of the CC in which the acknowledgement ACK message of the DCI is located.

Optionally, the subcarrier spacing determining rule includes at least one of the following:

determining a subcarrier spacing of a first BWP on a second CC as a second target subcarrier spacing corresponding to the first BWP on the second CC;

determining, based on a subcarrier spacing of a second BWP, the second target subcarrier spacing corresponding to the first BWP on the second CC, where the second BWP is a BWP in which a first PDCCH is located, and the first PDCCH is a PDCCH carrying the DCI;

determining, based on a subcarrier spacing of a third BWP, the second target subcarrier spacing corresponding to the first BWP on the second CC, where the third BWP is a BWP in which an acknowledgement ACK message of the DCI is located;

determining, based on an eighth preset subcarrier spacing, the second target subcarrier spacing corresponding to the first BWP on the second CC, where the eighth preset subcarrier spacing is obtained by processing, according to the preset processing rule, the subcarrier spacing of the first BWP and the subcarrier spacing of the second BWP;

determining, based on a ninth preset subcarrier spacing, the second target subcarrier spacing corresponding to the first BWP on the second CC, where the ninth preset subcarrier spacing is obtained by processing, according to the preset processing rule, the subcarrier spacing of the first BWP and the subcarrier spacing of the third BWP;

determining, based on a tenth preset subcarrier spacing, the second target subcarrier spacing corresponding to the first BWP on the second CC, where the tenth preset subcarrier spacing is obtained by processing, according to the preset processing rule, the subcarrier spacing of the first BWP, the subcarrier spacing of the second BWP, and the subcarrier spacing of the third BWP;

determining, based on an eleventh preset subcarrier spacing, a second target subcarrier spacing corresponding to a first BWP on each of the N CCs, where the eleventh preset subcarrier spacing is obtained by processing subcarrier spacings of all first BWPs on all CCs in the N CCs according to the preset processing rule;

determining, based on a twelfth preset subcarrier spacing, the second target subcarrier spacing corresponding to the first BWP on each of the N CCs, where the twelfth preset subcarrier spacing is obtained by processing the subcarrier spacings of the first BWPs on all the CCs in the N CCs and the subcarrier spacing of the second BWP according to the preset processing rule;

determining, based on a thirteenth preset subcarrier spacing, the second target subcarrier spacing corresponding to the first BWP on each of the N CCs, where the thirteenth preset subcarrier spacing is obtained by processing the subcarrier spacings of the first BWPs on all the CCs in the N CCs and the subcarrier spacing of the third BWP according to the preset processing rule; or determining, based on a fourteenth preset subcarrier spacing, the second target subcarrier spacing corresponding to the first BWP on each of the N CCs, where the fourteenth preset subcarrier spacing is obtained by processing the subcarrier spacings of the first BWPs on all the CCs in the N CCs, the subcarrier spacing of the second BWP, and the subcarrier spacing of the third BWP according to the preset processing rule.

Optionally, the preset processing rule includes at least one of the following:

selecting a largest subcarrier spacing;

selecting a smallest subcarrier spacing;

selecting a subcarrier spacing of a CC with a smallest index;

selecting a subcarrier spacing of a CC with a largest index;

selecting a subcarrier spacing of a BWP with a smallest BWP identifier; or selecting a subcarrier spacing of a BWP with a largest BWP identifier.

Optionally, the processor 610 is configured to determine a first duration based on the target subcarrier spacing or based on the target subcarrier spacing and a fifteenth preset subcarrier spacing; and determine a beam application time based on the first duration.

The fifteenth preset subcarrier spacing is determined based on a subcarrier spacing of a CC in which an acknowledgment ACK message of the DCI is located, or based on a subcarrier spacing of a CC in which a first PDCCH is located; or the fifteenth preset subcarrier spacing is determined based on a subcarrier spacing of a second BWP or a subcarrier spacing of a third BWP, where the second BWP is a BWP in which the first PDCCH is located, the third BWP is a BWP in which the ACK message of the DCI is located, and the first PDCCH is a PDCCH carrying the DCI.

Optionally, the processor 610 is configured to determine a time unit with the first duration after a first time unit as the beam application time; where the first time unit is one of the following:

a time unit in which the DCI is located;

a time unit in which the ACK message corresponding to the DCI is located;

a time unit with a second duration after the time unit in which the DCI is located; and a time unit with the second duration after the time unit for the ACK message corresponding to the DCI.

Optionally, the processor 610 is configured to determine the first duration based on a ratio of the target subcarrier spacing to the fifteenth preset subcarrier spacing.

Optionally, the second duration is determined based on one of the following:

the subcarrier spacing of the CC in which the first PDCCH is located;

the subcarrier spacing of the CC in which the acknowledgment ACK message of the DCI is located;

the subcarrier spacing of the BWP in which the first PDCCH is located; and the subcarrier spacing of the BWP in which the acknowledgment ACK message of the DCI is located.

Optionally, the processor 610 is configured to determine, for the terminal, the beam application time based on the target subcarrier spacing in a case that a first condition is satisfied.

The first condition includes one of the following:

a fifteenth preset subcarrier spacing is different from the target subcarrier spacing; and the fifteenth preset subcarrier spacing is different from the target subcarrier spacing, and the fifteenth preset subcarrier spacing is less than or equal to the target subcarrier spacing; where The fifteenth preset subcarrier spacing is determined based on a subcarrier spacing of a CC in which an acknowledgment ACK message of the DCI is located, or based on a subcarrier spacing of a CC in which a first PDCCH is located; or the fifteenth preset subcarrier spacing is determined based on a subcarrier spacing of a second BWP or a subcarrier spacing of a third BWP, where the second BWP is a BWP in which the first PDCCH is located, the third BWP is a BWP in which the ACK message of the DCI is located, and the first PDCCH is a PDCCH carrying the DCI.

In this embodiment of this application, after receiving the beam indication signaling, the terminal determines, according to the subcarrier spacing determining rule, the first target subcarrier spacing corresponding to the N component carriers CCs or the second target subcarrier spacing corresponding to the first bandwidth part BWP of the N CCs, and determines the first beam application time based on the first target subcarrier spacing or determines the second beam application time based on the second target subcarrier spacing, so as to determine the beam application time corresponding to the plurality of CCs or the BWPs of the plurality of CCs. This ensures consistent understanding on the beam application time between the network and the UE, which in turn can ensure beam alignment and correct data transmission.

Figure 7:
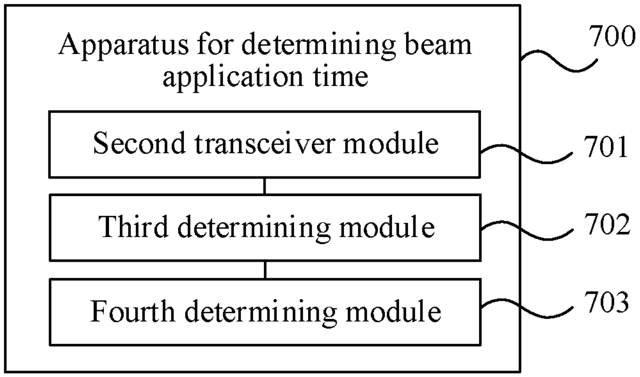
FIG. 7 is a second schematic modular diagram of an apparatus for determining beam application time according to an embodiment of this application.

As shown in FIG. 7, an embodiment of this application further provides an apparatus 700 for determining beam application time including:

a second transceiver module 701, configured to send beam indication signaling, where the beam indication signaling is used to indicate common beam information;

a third determining module 702 configured to determine a target subcarrier spacing according to a subcarrier spacing determining rule, where the target subcarrier spacing includes a first target subcarrier spacing corresponding to N component carriers CCs or a second target subcarrier spacing corresponding to a first bandwidth part BWP of the N CCs, N is greater than or equal to 1, the first BWP is a BWP to which the common beam information is applied, and the first BWP includes at least one of an uplink BWP or a downlink BWP; and a fourth determining module 703 configured to determine a beam application time based on the target subcarrier spacing, where the beam application time includes a first beam application time corresponding to the N CCs or a second beam application time corresponding to the first BWP of the N CCs.

Optionally, the second transceiver module is configured to send downlink control information DCI or a media access control control element MAC CE, where the DCI or the MAC CE carries the beam indication signaling.

Optionally, the DCI or the MAC CE is not used for scheduling data transmission.

Optionally, N>1, and N CCs belong to a first CC group. The DCI or the MAC CE indicates identification information of the first CC group; or the DCI or the MAC CE indicates identification information of a first CC, the first CC being included in the first CC group.

Optionally, the subcarrier spacing determining rule includes at least one of the following:

determining a subcarrier spacing of a second CC as a first target subcarrier spacing corresponding to the second CC, where the second CC is any one of the N CCs;

determining, based on a subcarrier spacing of a CC in which a first physical downlink control channel PDCCH is located, the first target subcarrier spacing corresponding to the second CC, where the first PDCCH is a PDCCH carrying the DCI;

determining, based on a subcarrier spacing of a CC in which an acknowledgement ACK message of the DCI is located, the first target subcarrier spacing corresponding to the second CC;

determining, based on a first preset subcarrier spacing, the first target subcarrier spacing corresponding to the second CC, where the first preset subcarrier spacing is obtained by processing, according to a preset processing rule, the subcarrier spacing of the second CC and the subcarrier spacing of the CC in which the first PDCCH is located;

determining, based on a second preset subcarrier spacing, the first target subcarrier spacing corresponding to the second CC, where the second preset subcarrier spacing is obtained by processing, according to a preset processing rule, the subcarrier spacing of the second CC and the subcarrier spacing of the CC in which the acknowledgement ACK message of the DCI is located;

determining, based on a third preset subcarrier spacing, the first target subcarrier spacing corresponding to the second CC, where the third preset subcarrier spacing is obtained by processing, according to the preset processing rule, the subcarrier spacing of the second CC, the subcarrier spacing of the CC in which the first PDCCH is located, and the subcarrier spacing of the CC in which the acknowledgement ACK message of the DCI is located;

determining, based on a fourth preset subcarrier spacing, a first target subcarrier spacing corresponding to each of the N CCs, where the fourth preset subcarrier spacing is obtained by processing subcarrier spacings of all CCs in the N CCs according to the preset processing rule;

determining, based on a fifth preset subcarrier spacing, the first target subcarrier spacing corresponding to each of the N CCs, where the fifth preset subcarrier spacing is obtained by processing, according to the preset processing rule, the subcarrier spacings of all the CCs in the N CCs and the subcarrier spacing of the CC in which the first PDCCH is located;

determining, based on a sixth preset subcarrier spacing, the first target subcarrier spacing corresponding to each of the N CCs, where the sixth preset subcarrier spacing is obtained by processing, according to the preset processing rule, the subcarrier spacings of all the CCs in the N CCs and the subcarrier spacing of the CC in which the acknowledgement ACK message of the DCI is located; or determining, based on a seventh preset subcarrier spacing, the first target subcarrier spacing corresponding to each of the N CCs, where the seventh preset subcarrier spacing is obtained by processing, according to the preset processing rule, the subcarrier spacings of all the CCs in the N CCs, the subcarrier spacing of the CC in which the first PDCCH is located, and the subcarrier spacing of the CC in which the acknowledgement ACK message of the DCI is located.

Optionally, the subcarrier spacing determining rule includes at least one of the following:

determining a subcarrier spacing of a first BWP on a second CC as a second target subcarrier spacing corresponding to the first BWP on the second CC;

determining, based on a subcarrier spacing of a second BWP, the second target subcarrier spacing corresponding to the first BWP on the second CC, where the second BWP is a BWP in which a first PDCCH is located, and the first PDCCH is a PDCCH carrying the DCI;

determining, based on a subcarrier spacing of a third BWP, the second target subcarrier spacing corresponding to the first BWP on the second CC, where the third BWP is a BWP in which an acknowledgement ACK message of the DCI is located;

determining, based on an eighth preset subcarrier spacing, the second target subcarrier spacing corresponding to the first BWP on the second CC, where the eighth preset subcarrier spacing is obtained by processing, according to the preset processing rule, the subcarrier spacing of the first BWP and the subcarrier spacing of the second BWP;

determining, based on a ninth preset subcarrier spacing, the second target subcarrier spacing corresponding to the first BWP on the second CC, where the ninth preset subcarrier spacing is obtained by processing, according to the preset processing rule, the subcarrier spacing of the first BWP and the subcarrier spacing of the third BWP;

determining, based on a tenth preset subcarrier spacing, the second target subcarrier spacing corresponding to the first BWP on the second CC, where the tenth preset subcarrier spacing is obtained by processing, according to the preset processing rule, the subcarrier spacing of the first BWP, the subcarrier spacing of the second BWP, and the subcarrier spacing of the third BWP;

determining, based on an eleventh preset subcarrier spacing, a second target subcarrier spacing corresponding to a first BWP on each of the N CCs, where the eleventh preset subcarrier spacing is obtained by processing subcarrier spacings of all first BWPs on all CCs in the N CCs according to the preset processing rule;

determining, based on a twelfth preset subcarrier spacing, the second target subcarrier spacing corresponding to the first BWP on each of the N CCs, where the twelfth preset subcarrier spacing is obtained by processing the subcarrier spacings of the first BWPs on all the CCs in the N CCs and the subcarrier spacing of the second BWP according to the preset processing rule;

determining, based on a thirteenth preset subcarrier spacing, the second target subcarrier spacing corresponding to the first BWP on each of the N CCs, where the thirteenth preset subcarrier spacing is obtained by processing the subcarrier spacings of the first BWPs on all the CCs in the N CCs and the subcarrier spacing of the third BWP according to the preset processing rule; or determining, based on a fourteenth preset subcarrier spacing, the second target subcarrier spacing corresponding to the first BWP on each of the N CCs, where the fourteenth preset subcarrier spacing is obtained by processing the subcarrier spacings of the first BWPs on all the CCs in the N CCs, the subcarrier spacing of the second BWP, and the subcarrier spacing of the third BWP according to the preset processing rule.

Optionally, the preset processing rule includes at least one of the following:

selecting a largest subcarrier spacing;

selecting a smallest subcarrier spacing;

selecting a subcarrier spacing of a CC with a smallest index;

selecting a subcarrier spacing of a CC with a largest index;

selecting a subcarrier spacing of a BWP with a smallest BWP identifier; or selecting a subcarrier spacing of a BWP with a largest BWP identifier.

Optionally, the fourth determining module includes:

a third determining submodule, configured to determine a first duration based on the target subcarrier spacing or based on the target subcarrier spacing and a fifteenth preset subcarrier spacing; and a fourth determining submodule, configured to determine a beam application time based on the first duration.

The fifteenth preset subcarrier spacing is determined based on a subcarrier spacing of a CC in which an acknowledgment ACK message of the DCI is located, or based on a subcarrier spacing of a CC in which a first PDCCH is located; or the fifteenth preset subcarrier spacing is determined based on a subcarrier spacing of a second BWP or a subcarrier spacing of a third BWP, where the second BWP is a BWP in which the first PDCCH is located, the third BWP is a BWP in which the ACK message of the DCI is located, and the first PDCCH is a PDCCH carrying the DCI.

Optionally, the fourth determining submodule is configured to determine a time unit with the first duration after a first time unit as the beam application time; where the first time unit is one of the following:

a time unit in which the DCI is located;

a time unit in which the ACK message corresponding to the DCI is located;

a time unit with a second duration after the time unit in which the DCI is located; and a time unit with the second duration after the time unit for the ACK message corresponding to the DCI.

Optionally, the third determining submodule is configured to determine the first duration based on a ratio of the target subcarrier spacing to the fifteenth preset subcarrier spacing.

Optionally, the second duration is determined based on one of the following:

the subcarrier spacing of the CC in which the first PDCCH is located;

the subcarrier spacing of the CC in which the acknowledgment ACK message of the DCI is located;

the subcarrier spacing of the BWP in which the first PDCCH is located; and the subcarrier spacing of the BWP in which the acknowledgment ACK message of the DCI is located.

Optionally, the fourth determining module is configured to determine, for the network-side device, the beam application time based on the target subcarrier spacing in a case that a first condition is satisfied.

The first condition includes one of the following:

a fifteenth preset subcarrier spacing is different from the target subcarrier spacing; and the fifteenth preset subcarrier spacing is different from the target subcarrier spacing, and the fifteenth preset subcarrier spacing is less than or equal to the target subcarrier spacing.

The fifteenth preset subcarrier spacing is determined based on a subcarrier spacing of a CC in which an acknowledgment ACK message of the DCI is located, or based on a subcarrier spacing of a CC in which a first PDCCH is located; or the fifteenth preset subcarrier spacing is determined based on a subcarrier spacing of a second BWP or a subcarrier spacing of a third BWP, where the second BWP is a BWP in which the first PDCCH is located, the third BWP is a BWP in which the ACK message of the DCI is located, and the first PDCCH is a PDCCH carrying the DCI.

In this embodiment of this application, after sending the beam indication signaling, the network-side device determines, according to the subcarrier spacing determining rule, the first target subcarrier spacing corresponding to the N component carriers CCs or the second target subcarrier spacing corresponding to the first bandwidth part BWP of the N CCs, and determines the first beam application time based on the first target subcarrier spacing or determines the second beam application time based on the second target subcarrier spacing, so as to determine the beam application time corresponding to the plurality of CCs or the BWPs of the plurality of CCs. This ensures consistent understanding on the beam application time between the network and the UE, which in turn can ensure beam alignment and correct data transmission.

An embodiment of this application further provides a network-side device, including a processor and a communication interface. The communication interface is configured to send beam indication signaling, where the beam indication signaling is used to indicate common beam information. The processor is configured to determine a target subcarrier spacing according to a subcarrier spacing determining rule, where the target subcarrier spacing includes a first target subcarrier spacing corresponding to N component carriers CCs or a second target subcarrier spacing corresponding to a first bandwidth part BWP of the N CCs, N is greater than or equal to 1, the first BWP is a BWP to which the common beam information is applied, and the first BWP includes at least one of an uplink BWP or a downlink BWP; and determine a beam application time based on the target subcarrier spacing, where the beam application time includes a first beam application time corresponding to the N CCs or a second beam application time corresponding to the first BWP of the N CCs. The network-side device embodiments correspond to the foregoing network-side device method embodiments, and the implementation processes and implementations of the foregoing method embodiments can be applied to the network-side device embodiments, with the same technical effects achieved.

Figure 8:
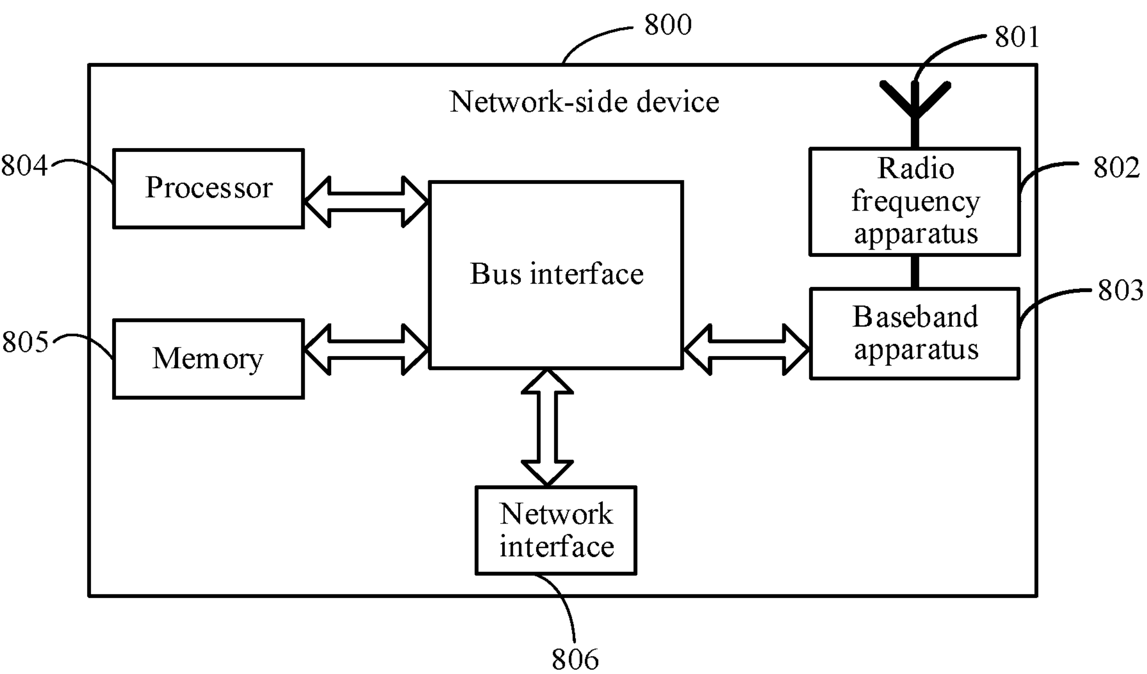
FIG. 8 is a structural block diagram of a network-side device according to an embodiment of this application.

Specifically, an embodiment of this application further provides a network-side device. As shown in FIG. 8, the network-side device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes to-be-sent information, and sends the information to the radio frequency apparatus 802; and the radio frequency apparatus 802 processes the received information and then sends the information out by using the antenna 801.

The frequency band processing apparatus may be located in the baseband apparatus 803. The method performed by the network-side device in the foregoing embodiments may be implemented in the baseband apparatus 803, and the baseband apparatus 803 includes a processor 804 and a memory 805.

The baseband apparatus 803 may include, for example, at least one baseband board, where a plurality of chips are disposed on the baseband board. As shown in FIG. 8, one of the chips is, for example, the processor 804, connected to the memory 805, to invoke a program in the memory 805 to perform the operation of the network-side device shown in the foregoing method embodiment.

The baseband apparatus 803 may further include a network interface 806, configured to exchange information with the radio frequency apparatus 802, where the interface is, for example, a common public radio interface (CPRI).

Specifically, the network-side device in this embodiment of the present invention further includes: instructions or a program stored in the memory 805 and capable of running on the processor 804. The processor 804 invokes the instructions or program in the memory 805 to execute the method executed by the modules shown in FIG. 7, with the same technical effects achieved. To avoid repetition, details are not repeated herein.

An embodiment of this application further provides a readable storage medium. The readable storage medium may be non-volatile or volatile. A program or instructions are stored in the readable storage medium. When the program or instructions are executed by a processor, the processes of the foregoing embodiment of the method for determining beam application time can be implemented, with the same technical effects achieved. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a computer program product, where the computer program product is stored in a storage medium, and when being executed by at least one processor, the computer program product is configured to implement the processes of the foregoing embodiments of the method for determining beam application time, with the same technical effects achieved. To avoid repetition, details are not repeated herein.

An embodiment of this application further provides a chip, where the chip includes a processor and a communication interface. The communication interface is coupled to the processor, and the processor is configured to run a program or instructions to implement the processes of the foregoing embodiments of the method for determining beam application time, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A method for determining beam application time, comprising:

receiving, by a terminal, beam indication signaling, wherein the beam indication signaling is used to indicate common beam information;

determining, by the terminal, a target subcarrier spacing according to a subcarrier spacing determining rule, wherein the target subcarrier spacing comprises a second target subcarrier spacing corresponding to a first bandwidth part BWP of N component carriers CC, N is greater than or equal to 1, the first BWP is a BWP to which the common beam information is applied, and the first BWP comprises at least one of an uplink BWP or a downlink BWP; and determining, by the terminal, a beam application time based on the target subcarrier spacing, wherein the beam application time comprises a second beam application time corresponding to the first BWP of the N CCs, wherein the subcarrier spacing determining rule comprises:

determining, based on an eleventh preset subcarrier spacing, a second target subcarrier spacing corresponding to a first BWP on each of the N CCs, where the eleventh preset subcarrier spacing is obtained by processing subcarrier spacings of all first BWPs on all CCs in the N CCs according to the preset processing rule, and the preset processing rule comprises: selecting a smallest subcarrier spacing.

2. The method according to claim 1, wherein the receiving, by a terminal, beam indication signaling comprises:

receiving, by the terminal, downlink control information DCI or a media access control control element MAC CE, wherein the DCI or the MAC CE carries the beam indication signaling.

3. The method according to claim 2, wherein the DCI or the MAC CE is not used for scheduling data transmission.

4. The method according to claim 2, wherein N>1 and the N CCs belong to a first CC group;

the DCI or the MAC CE indicates identification information of the first CC group; or the DCI or the MAC CE indicates identification information of a first CC, the first CC being comprised in the first CC group.

5. The method according to claim 2, wherein the determining, by the terminal, a beam application time based on the target subcarrier spacing comprises:

determining a first duration based on the target subcarrier spacing or based on the target subcarrier spacing and a fifteenth preset subcarrier spacing; and determining a beam application time based on the first duration; wherein the fifteenth preset subcarrier spacing is determined based on a subcarrier spacing of a CC in which an acknowledgment ACK message of the DCI is located, or based on a subcarrier spacing of a CC in which a first PDCCH is located; or the fifteenth preset subcarrier spacing is determined based on a subcarrier spacing of a second BWP or a subcarrier spacing of a third BWP, wherein the second BWP is a BWP in which the first PDCCH is located, the third BWP is a BWP in which the ACK message of the DCI is located, and the first PDCCH is a PDCCH carrying the DCI.

6. The method according to claim 2, further comprising determining beam application time based on a first duration;

wherein the determining the beam application time based on the first duration comprises:

determining a time unit with the first duration after a first time unit as the beam application time; wherein the first time unit is one of the following:

a time unit in which the DCI is located;

a time unit in which the ACK message corresponding to the DCI is located;

a time unit with a second duration after the time unit in which the DCI is located; and a time unit with the second duration after the time unit for the ACK message corresponding to the DCI.

7. The method according to claim 6, wherein the second duration is determined according to:

the subcarrier spacing of the CC in which the acknowledgment ACK message of the DCI is located.

8. The method according to claim 6, wherein the first duration is determined based on the smallest subcarrier spacing SCS.

9. The method according to claim 2, wherein the determining, by the terminal, a beam application time based on the target subcarrier spacing comprises:

determining, by the terminal, the beam application time based on the target subcarrier spacing in a case that a first condition is satisfied; wherein the first condition comprises one of the following:

a fifteenth preset subcarrier spacing is different from the target subcarrier spacing; and the fifteenth preset subcarrier spacing is different from the target subcarrier spacing, and the fifteenth preset subcarrier spacing is less than or equal to the target subcarrier spacing; wherein the fifteenth preset subcarrier spacing is determined based on a subcarrier spacing of a CC in which an acknowledgment ACK message of the DCI is located, or based on a subcarrier spacing of a CC in which a first PDCCH is located; or the fifteenth preset subcarrier spacing is determined based on a subcarrier spacing of a second BWP or a subcarrier spacing of a third BWP, wherein the second BWP is a BWP in which the first PDCCH is located, the third BWP is a BWP in which the ACK message of the DCI is located, and the first PDCCH is a PDCCH carrying the DCI.

10. A terminal, comprising a processor, a memory, and a program or instructions stored in the memory and capable of running on the processor, wherein the program or instructions are executed by the processor to implement:

receiving beam indication signaling, wherein the beam indication signaling is used to indicate common beam information;

determining a target subcarrier spacing according to a subcarrier spacing determining rule, wherein the target subcarrier spacing comprises a second target subcarrier spacing corresponding to a first bandwidth part BWP N component carriers CC, N is greater than or equal to 1, the first BWP is a BWP to which the common beam information is applied, and the first BWP comprises at least one of an uplink BWP or a downlink BWP; and determining a beam application time based on the target subcarrier spacing, wherein the beam application time comprises a second beam application time corresponding to the first BWP of the N CCs, wherein the subcarrier spacing determining rule comprises:

determining, based on an eleventh preset subcarrier spacing, a second target subcarrier spacing corresponding to a first BWP on each of the N CCs, where the eleventh preset subcarrier spacing is obtained by processing subcarrier spacings of all first BWPs on all CCs in the N CCs according to the preset processing rule, and the preset processing rule comprises: selecting a smallest subcarrier spacing.

11. The terminal according to claim 10, wherein the receiving, by a terminal, beam indication signaling comprises:

receiving, by the terminal, downlink control information DCI or a media access control control element MAC CE, wherein the DCI or the MAC CE carries the beam indication signaling.

12. The terminal according to claim 11, wherein the DCI or the MAC CE is not used for scheduling data transmission.

13. The terminal according to claim 11, wherein N>1 and the N CCs belong to a first CC group;

the DCI or the MAC CE indicates identification information of the first CC group; or the DCI or the MAC CE indicates identification information of a first CC, the first CC being comprised in the first CC group.

14. The terminal according to claim 11, wherein the determining, by the terminal, a beam application time based on the target subcarrier spacing comprises:

determining a first duration based on the target subcarrier spacing or based on the target subcarrier spacing and a fifteenth preset subcarrier spacing; and determining a beam application time based on the first duration; wherein the fifteenth preset subcarrier spacing is determined based on a subcarrier spacing of a CC in which an acknowledgment ACK message of the DCI is located, or based on a subcarrier spacing of a CC in which a first PDCCH is located; or the fifteenth preset subcarrier spacing is determined based on a subcarrier spacing of a second BWP or a subcarrier spacing of a third BWP, wherein the second BWP is a BWP in which the first PDCCH is located, the third BWP is a BWP in which the ACK message of the DCI is located, and the first PDCCH is a PDCCH carrying the DCI.

15. The terminal according to claim 11, wherein the program or instructions are further executed by the processor to implement following step:

determining beam application time based on a first duration;

wherein the determining the beam application time based on the first duration comprises:

determining a time unit with the first duration after a first time unit as the beam application time; wherein the first time unit is one of the following:

a time unit in which the DCI is located;

a time unit in which the ACK message corresponding to the DCI is located;

a time unit with a second duration after the time unit in which the DCI is located; and a time unit with the second duration after the time unit for the ACK message corresponding to the DCI.

16. The terminal according to claim 15, wherein the second duration is determined according to:

the subcarrier spacing of the CC in which the acknowledgment ACK message of the DCI is located.

17. The terminal according to claim 15, wherein the first duration is determined based on the smallest subcarrier sapcing SCS.

18. A non-transitory readable storage medium, wherein the non-transitory readable storage medium stores a program or instructions, and when the program or instructions are executed by a processor, following steps are implemented:

receiving beam indication signaling, wherein the beam indication signaling is used to indicate common beam information;

determining a target subcarrier spacing according to a subcarrier spacing determining rule, wherein the target subcarrier spacing comprises a second target subcarrier spacing corresponding to a first bandwidth part BWP of N component carriers CC, N is greater than or equal to 1, the first BWP is a BWP to which the common beam information is applied, and the first BWP comprises at least one of an uplink BWP or a downlink BWP; and determining a beam application time based on the target subcarrier spacing, wherein the beam application time comprises a second beam application time corresponding to the first BWP of the N CCs, wherein the subcarrier spacing determining rule comprises:

determining, based on an eleventh preset subcarrier spacing, a second target subcarrier spacing corresponding to a first BWP on each of the N CCs, where the eleventh preset subcarrier spacing is obtained by processing subcarrier spacings of all first BWPs on all CCs in the N CCs according to the preset processing rule, and the preset processing rule comprises: selecting a smallest subcarrier spacing.

* * * * *